US007123610B2

(12) United States Patent
Inouchi et al.

(10) Patent No.: US 7,123,610 B2
(45) Date of Patent: *Oct. 17, 2006

(54) NODE APPARATUS AND PACKET COMMUNICATION METHOD FOR COMMUNICATING WITH A MOBILE TERMINAL

(75) Inventors: Hidenori Inouchi, Higashimurayama (JP); Takumi Ohishi, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/966,067

(22) Filed: Oct. 18, 2004

(65) Prior Publication Data

US 2005/0058119 A1    Mar. 17, 2005

Related U.S. Application Data

(63) Continuation of application No. 09/514,288, filed on Feb. 28, 2000, now Pat. No. 6,839,350.

(30) Foreign Application Priority Data

Jun. 29, 1999  (JP)  ............................ 11-184299

(51) Int. Cl.
  *H04L 12/66*  (2006.01)
  *H04L 12/28*  (2006.01)
  *H04B 7/216*  (2006.01)

(52) U.S. Cl. .................. 370/356; 370/389; 370/392; 370/400

(58) Field of Classification Search ........ 370/352–356, 370/335, 342, 389, 392, 400–401, 466; 709/212, 709/227, 230–242
See application file for complete search history.

(56) References Cited

U.S. PATENT DOCUMENTS

| 6,289,013 | B1 * | 9/2001 | Lakshman et al. ......... 370/389 |
| 6,434,134 | B1 | 8/2002 | La Porta et al. ........... 370/338 |
| 6,466,985 | B1 | 10/2002 | Goyal et al. ................ 709/238 |
| 6,496,505 | B1 * | 12/2002 | La Porta et al. ........... 370/392 |
| 6,501,746 | B1 | 12/2002 | Leung ........................ 370/338 |
| 6,839,350 | B1 * | 1/2005 | Inouchi et al. ............. 370/392 |

OTHER PUBLICATIONS

ETSI "GSM 03.60 Stage2 Service Description of the General Packet Radio Service (GPRS)", Oct. 1998, pp. 1-108.

* cited by examiner

*Primary Examiner*—Chi Pham
*Assistant Examiner*—Melanie Jagannathan
(74) *Attorney, Agent, or Firm*—Mattingly, Stanger, Malur & Brundidge, P.C.

(57) ABSTRACT

A node apparatus for providing versatility in routing of IP packets in communication between mobile terminals, comprising a first memory containing entries each defining routing information corresponding to a destination address, a second memory containing entries each defining a header processing rule corresponding to a combination of source and destination addresses, and a routing controller for converting a header processing rule defined in the second memory and for delivering the outgoing packet to an output port according to routing information defined in the first memory.

3 Claims, 14 Drawing Sheets

FIG. 8

23 HOME LOCATION REGISTER

| DESTINATION TERMINAL IP ADDRESS (DA) ~231 | DESTINATION ROUTER IP ADDRESS ~232 |
|---|---|
| B | CoB1 |
| XX | XXXX |

24 ROUTING REGISTER

| DESTINATION TERMINAL IP ADDRESS (DA) ~241 | NEXT HOP IP ADDRESS ~242 | Tx DESCRIPTOR (OUTPUT PORT) No. ~243 | OUTPUT PORT IP ADDRESS ~244 | |
|---|---|---|---|---|
| B | XXXXXXX | 1 | CoA1 | ~240-1 |
|  |  |  |  | ~240-2 |
| B | XX···· | 2 | CoA2 | ~240P-1 |

FIG. 10

25-A ROUTE POLICY REGISTER

| SOURCE IP ADDRESS (SA) | DESTINATION IP ADDRESS (DA) | TUNNELING SOURCE IP ADDRESS | TUNNELING DESTINATION IP ADDRESS | ICMP FLAG | |
|---|---|---|---|---|---|
| A | B | "SELF" | "DUP" | 0 | ~ 250-11 |
| B | A | "NONE" | "NONE" | 0 | ~ 250-12 |
| ⋮ | | | | | |
| A | B | "SELF" | CoB2 | 0 | ~ 250P-11 |
| | | | | | |

FIG. 11

25-b ROUTE POLICY REGISTER

| SOURCE IP ADDRESS (SA) | DESTINATION IP ADDRESS (DA) | TUNNELING SOURCE IP ADDRESS | TUNNELING DESTINATION IP ADDRESS | ICMP FLAG | |
|---|---|---|---|---|---|
| A | B | "KEEP" | "CNV" | 0 | ~ 250-21 |
| B | A | "SELF" | CoA1 | 0 | ~ 250-22 |
| | | | | | |

FIG. 12

25-B ROUTE POLICY REGISTER

| SOURCE IP ADDRESS (SA) | DESTINATION IP ADDRESS (DA) | TUNNELING SOURCE IP ADDRESS | TUNNELING DESTINATION IP ADDRESS | ICMP FLAG | |
|---|---|---|---|---|---|
| A | B | "NONE" | "NONE" | 1 | ~ 250-31 |
| B | A | "SELF" | CoA1 | 0 | ~ 250-32 |
| ⋮ | | | | | |
| B | A | "SELF" | HB | 0 | ~ 250P-32 |

NODE APPARATUS AND PACKET COMMUNICATION METHOD FOR COMMUNICATING WITH A MOBILE TERMINAL

The present application is a continuation of application Ser. No. 09/514,288, filed Feb. 28, 2000 now U.S. Pat. No. 6,839,350, the contents of which are incorporated herein by reference.

BACKGROUND OF THE INVENTION (1) Field of the Invention

The present invention relates to a node apparatus and packet communication method in a packet communication network. More particularly, the invention pertains to a node apparatus and packet communication method in a packet communication network through which communication with a mobile terminal is carried out.

(2) Description of the Related Art

Recent years have seen a significant increase in traffic in a packet communication network based on the Internet Protocol (IP) because of the widespread proliferation of World Wide Web (WWW) applications. In the Internet, a node apparatus for interconnecting networks is provided with a routing table which is updated according to the IP routing protocol, and the routing table is referred to based on a destination IP address contained in a header of a received packet in order to determine an outgoing path for the received packet.

Conventionally, functionality for supporting mobile terminals in the Internet is unsatisfactory, and therefore the Internet is primarily used for communication between stationary terminals. In order for a mobile terminal to carry out IP packet communication with another stationary or mobile terminal, a connection must be pre-established between the mobile terminal and a network stationary server (e.g., PPP server) according to the Point-to-Point Protocol (PPP) or any other data link layer protocol so that the network stationary server can work as a router.

Since the above-mentioned conventional method is based on the premise that the mobile terminal is connected to the stationary server prior to IP packet communication, no problem occurs in a situation where the mobile terminal starts originating communication with another stationary terminal. However, in a situation where it is attempted to start communication with the mobile terminal used as a destination, IP packets cannot be sent to the mobile terminal since the mobile terminal is not yet connected to the stationary server at the start of communication. That is to say, unlike conventional telephone communication, the prior art method mentioned above does not provide support functionality for allowing the start of communication by calling (paging) a mobile terminal to be accessed as a destination.

A variety of schemes based on the ITU IMT-2000 have been proposed for realizing a network architecture in which it is allowed to call a destination mobile terminal for IP packet transmission thereto as in the conventional telephone communication. As a representative scheme thereamong, ETSI "GSM03.60 Stage-2 Service Description of the General Packet Radio Service (GPRS)" is found.

A packet switched network based on the GPRS scheme comprises subscriber exchanges and gateway exchanges as in a conventional telephone switching system network. In the packet switched network, an origination terminal (stationary or mobile terminal) calls a destination mobile terminal through a signaling procedure similar to a conventional telephone call control procedure, and then the origination terminal sends IP packets to the destination mobile terminal.

Where mobile terminals are used at both the origination and destination points, IP packets are transmitted to an origination home gateway exchange (origination home agent node) located in a home area of an originator (origination mobile terminal) through a visitor subscriber exchange (origination node) located in a visitor area of the originator. At this step of operation, the origination visitor subscriber exchange (origination node) adds a new header (encapsulation header) to each IP packet received from the origination mobile terminal, and then the received packet is sent to the origination home gateway exchange (origination home agent node) in a tunneling method.

The origination home gateway exchange removes the encapsulation header from the received packet (decapsulation), and the origination home gateway exchange identifies a destination home gateway exchange (destination home agent node) of a recipient (destination mobile terminal) according to a destination IP address contained in a header field of each original IP packet. The origination home gateway exchange also adds a new header (encapsulation header) to each received IP packet, which is then sent to the destination home gateway exchange in the tunneling method.

The destination home gateway exchange decapsulates the received packet, and based on a home IP address of the destination mobile terminal indicated by the IP address contained in the header field of each original IP packet, the destination home gateway exchange makes reference to a home location register in which information on the current location of the destination mobile terminal is stored. Thus, a destination visitor subscriber exchange (destination node) corresponding to the current location of the destination mobile terminal can be identified. When the destination visitor subscriber exchange which allows communication with the destination mobile terminal is identified as mentioned above, the destination home gateway exchange encapsulates the IP packet, which is then sent to the destination visitor subscriber exchange for the recipient in the tunneling method. The destination visitor subscriber exchange for the recipient decapsulates the received packet to obtain the original IP packet. Then, the original IP packet is transferred to a connection port connected with a wireless base station which covers the current location of the destination mobile terminal.

A section of communication between a sending node which encapsulates IP packets and a receiving node which decapsulates the encapsulated packets to obtain the original IP packets is commonly referred to as a tunnel. In the above example of packet communication between mobile terminals based on the GPRS scheme, a total of three tunnels are formed between the origination visitor subscriber exchange and the origination home gateway exchange, between the origination home gateway exchange and the destination home gateway exchange, and between the destination home gateway exchange and the destination visitor subscriber exchange.

SUMMARY OF THE INVENTION

In the conventional mobile-terminal-to-mobile-terminal packet communication stated above, three tunneling communication processes are required for transferring IP packets from an origination mobile terminal to a destination mobile terminal. Since encapsulation and decapsulation of received IP packets are repeated at a node apparatus (subscriber exchange or gateway exchange) located at each end of a tunnel, there is a problem that a delay in IP packet transfer is increased. This problem also arises in packet transfer from the destination mobile terminal to the origination mobile terminal.

It is therefore an object of the present invention to reduce a packet transfer delay in packet communication in which a mobile terminal is used at either or both of origination and destination points.

Another object of the present invention is to provide a node apparatus and packet communication method for transferring received packets to a destination terminal while minimizing the number of tunneling communication processes in packet communication in which a mobile terminal is used at either or both of origination and destination points.

In the above-mentioned conventional mobile-terminal-to-mobile-terminal packet communication based on the GPRS scheme, packets received from a mobile terminal are transferred to a destination node (destination visitor subscriber exchange) through origination and destination home agent nodes (home gateway exchanges) in which information on the current location of each mobile terminal is managed. Among the three tunnels formed in the GPRS scheme described above, the last tunnel formed between the destination home agent node and the destination node is critical. A tunnel from the origination node to the origination home agent node may be omitted, i.e., direct tunneling may be made from the origination node to the destination home agent node.

In the conventional technique, packets are transferred through the destination home agent node because of the following reason: Even if the destination terminal being in packet communication moves to change over to another destination node, it is required to transfer received packets properly from the destination home agent node to the destination node corresponding to a new location of the destination terminal. This requirement is based on the premise that the destination terminal being in packet communication may move over a range of considerably long distance.

A further object of the present invention is to provide a node apparatus and packet communication method for selecting a proper routing mode in terminal-to-terminal packet communication in which a mobile terminal being in packet communication moves within a range of relatively short distance to scarcely require changeover to another destination node during communication.

An additional object of the present invention is to provide a node apparatus and packet communication method for transferring received packets through an optimum route independently of a home agent node in packet communication in which a mobile terminal is used at either or both of origination and destination points.

An even further object of the present invention is to provide a node apparatus and packet communication method for selectively specifying a routing mode according to a combination of IP packet source and destination addresses in packet communication in which a mobile terminal is used at either or both of origination and destination points.

In accomplishing these objects of the present invention and according to one aspect thereof, there is provided a node apparatus comprising: a first memory (routing register) containing a plurality of entries each defining routing information corresponding to a packet destination address; a second memory (route policy register) containing a plurality of entries each defining a header processing rule corresponding to each combination of packet source and destination addresses; and a controller for converting a received packet into an outgoing packet according to a header processing rule defined in the second memory and for delivering the outgoing packet to an output port according to routing information defined in the first memory.

Each of said entries in the second memory defines a header processing rule corresponding to a combination of source and destination addresses contained in a header of each IP packet, and each of said header processing rules indicates a source and destination address decision rule or an address value for tunneling communication. According to source and destination addresses of a received IP packet or an IP packet obtained by decapsulating a packet received in an encapsulated form, the controller refers to the second memory and carries out conversion from the received packet to an outgoing packet.

More specifically, as an example, one of said entries in the second memory contains an address decision rule ("SELF") for specifying that an IP address taken out of the first memory according to a tunneling communication destination address defined in the entry is to be applied as a source address for tunneling communication. As another example, one of said entries in the second memory contains an address decision rule ("DUP") for specifying that a destination address of an IP header defined in the entry is to be applied as a destination address for tunneling communication or an address decision rule ("NONE") for specifying that destination and source addresses for tunneling communication are to be deleted.

According to a preferred embodiment of the present invention, each of said entries in the second memory contains flag information indicating whether or not a control packet should be sent to a node specified by a source address of a packet received in an encapsulated form, said control packet instructing said node to change a tunneling destination of an IP packet to be sent in a encapsulated form.

The above structure of a node apparatus according to the present invention is applicable as a home agent node as well as an origination or destination node in an IP network. In addition to the first and second memories, the home agent node comprises a third memory (home location register) for storing information on correspondence relationship between packet destination addresses and destination node addresses. One of entries in the second memory contains an address decision rule ("CNV"/"KEEP") for specifying, for example, that a destination node address taken out of the third memory according to an IP header destination address defined in the entry is to be applied as a destination address for tunneling communication and for specifying that a source address of a packet received in an encapsulated form is to be applied as a source address for tunneling communication.

According to another aspect of the present invention, there is provided a node apparatus comprising: a plurality of interface devices each having an input port and an output port; and a routing controller coupled with each of the plural interface devices. The routing controller comprises a buffer memory for storing packets received from each of said interface devices; a first memory containing a plurality of entries each defining routing information corresponding to a packet destination address; a second memory containing a plurality of entries each defining a header processing rule corresponding to a combination of packet source and destination addresses; and a processor for converting a received packet stored in the buffer memory into an outgoing packet according to a header processing rule defined in the second memory and for transferring the outgoing packet to an interface device selected according to routing information defined in the first memory.

According to a preferred embodiment of the present invention, the node apparatus is provided with a packet reception descriptor table and a packet transmission descriptor table prepared for each of said interface devices. In this embodiment, each of the interface devices informs the processor of a storing address of a received packet in the buffer memory through the use of the packet reception descriptor table. The processor makes circular reference to the packet reception descriptor table, accesses the buffer memory according to the storing address held in the packet reception descriptor table, converts the received packet into an outgoing packet, and writes a storing address of the outgoing packet into a packet transmission descriptor table corresponding to an interface device through which the outgoing packet should be sent out. Each of the interface devices reads out the outgoing packet from the buffer memory according to the storing address of the outgoing packet defined in the packet transmission descriptor table, and delivers the outgoing packet to an output port associated with the interface device.

One of the features of the present invention resides in that each of origination and destination node apparatuses communicating packets with terminals, is provided with means for communicating with each other in the upward and downward directions through a shortcut route using direct tunneling communication without intervention of a home agent node engaging in management of mobile terminal location information.

More specifically, according to another aspect of the present invention, there is provided a node apparatus, which is connected to a network including at least one home agent node engaging in management of mobile terminal location information, comprising: means for communicating in a first tunneling communication mode in which an IP packet addressed from a first terminal to a second terminal of a mobile type is encapsulated and the encapsulated packet is sent to a home agent node for managing location information of the second terminal; means for communicating in a second tunneling communication mode in which an IP packet addressed from the first terminal to the second terminal is encapsulated and the encapsulated packet is sent to a destination node located between the home agent node and the second terminal; and means for performing automatic changeover from the first tunneling communication mode to the second tunneling communication mode.

According to another aspect of the present invention, there is provided a packet communication method in a network including a first node apparatus communicating with a first terminal, a home agent node apparatus engaging in management of location information of a second terminal of a mobile type, and a second node apparatus communicating with the second terminal, the packet communication method comprising: (a) a step of transferring by said first node apparatus an IP packet which is transmitted from the first terminal to the second terminal, after converting the received IP packet into an encapsulated packet with a encapsulation header containing an IP address of the first node apparatus as a source address; (b) a step transferring said encapsulated packet to said second node by said home agent node apparatus after converting the header of the received packet into an encapsulation header containing the IP address of the first node apparatus as a source address and an IP address of the second node apparatus as a destination address; (c) a step transferring the IP packet to said second terminal by said second node apparatus after decapsulating the encapsulated packet received from the home agent node apparatus, then transmitting a control packet to the first node apparatus from the second node apparatus by using, as a destination address, the IP address of the first node apparatus contained as a source address in the received encapsulated packet, said control packet instructing the first node apparatus to change the rout of the encapsulated packet; and (d) a step of converting by said first node apparatus, after receiving the control packet, an IP packet addressed from the first terminal to the second terminal into an encapsulated packet addressed to the second node apparatus, thereby to transfer the encapsulated packet to said second node apparatus.

In the packet communication method mentioned above, packet routing from the first terminal to the second terminal is automatically changed from a normal mode of routing in which packets are transferred through the home agent node apparatus to a shortcut mode of routing in which packets are transferred without intervention of the home agent node apparatus. In the shortcut mode, upon receiving an IP packet addressed to the first terminal from the second terminal, the second node apparatus encapsulates the received IP packet and sends the encapsulated packet to the first node apparatus.

Another feature of the present invention resides in that each of origination and destination node apparatuses for sending and receiving packets in communication with terminals is provided with means for communicating packets with each other in the upward and downward directions through the same route by tunneling communication with the same home agent node engaging in management of mobile terminal location information.

More specifically, according to another aspect of the present invention, there is provided a node apparatus, which is connected to a network including a plurality of home agent nodes for engaging in management of mobile terminal location information, comprising: means for removing when an encapsulated packet containing an IP packet addressed to a first terminal of a mobile type from a second terminal is received from a first home agent node for managing location information of the first terminal, a header from the encapsulated packet to obtain the IP packet, and for transferring the IP packet to the first terminal; means for converting an IP packed addressed to the second terminal from the first terminal into a first encapsulated packet when the IP packet is received, and for transmitting the first encapsulated packet to the first home agent node; and means for converting an IP packet addressed to the second terminal from a third terminal into a second encapsulated packet when the IP packet is received, and for transmitting the second encapsulated packet to a second home agent node for managing location information of the second terminal.

According to another aspect of the present invention, there is provided a packet communication method in a network including a first node apparatus communicating with a first terminal, a home agent node apparatus engaging in management of location information of a second terminal of a mobile type, and a second node apparatus communicating with the second terminal, the packet communication method comprising: (a) a step of transferring by said first node apparatus an IP packet, which is transmitted from said first terminal to said second terminal, after converting the IP packet into an encapsulated packet with an encapsulation header containing an IP address of the first node apparatus as a source address; (b) a step of transferring said encapsulated packet to said second node apparatus by said home agent node apparatus after converting the header of the received packet into an encapsulation header containing the IP address of the first node apparatus as a source address and an IP address of the second node apparatus as a destination address; (c) a step of transferring the IP packet to said second terminal by said second node apparatus after decapsulating the encapsulated packet received from the home agent node apparatus; (d) a step of transferring by said second node apparatus an IP packet, which is transmitted from said second terminal to said first terminal, to said home agent node apparatus after converting the received IP packet into an encapsulated packet; and (e) a step of transferring the encapsulated packet received from the second node apparatus to said first node apparatus by said home agent node apparatus after converting the header of the received encapsulated packet.

Another feature of the present invention resides in that a node apparatus selectively adds a new entry into a second memory or alters the contents of an already registered entry according to header information of an encapsulated packed when the encapsulated packet is received from another node apparatus, thereby to dynamically change a packet communication route in tunneling communication between origination and destination nodes.

According to a packet communication method in a preferred embodiment of the present invention, a home agent node decapsulates an encapsulated packet received and adds a new encapsulation header to the decapsulated packet, which is then transferred to a destination node. At this step of operation, in the home agent node, a new entry having a source address contained in a header of the received encapsulated packet is added into a second memory to make preparation for relaying packets directed from a destination terminal to an origination terminal.

Upon receiving the encapsulated packet from the home agent node, the destination node makes preparation for relaying packets directed from the destination terminal to the origination terminal if selection of a shortcut route in communication between the terminals concerned is specified according to a header processing rule held in a second memory. To be more specific, in the destination node, a new entry having a source address contained in the header of the received encapsulated packet is added into the second memory, and a control packet containing a control message indicating a change of routing is issued to an origination node.

Receiving the control packet, the origination node rewrites the contents of a first memory and also alters a routing rule for communication between the terminals concerned, which is contained in a second memory. At the time that the encapsulated packet from the home agent node is received, if the second memory of the destination node indicates any other routing mode for communication between the terminals concerned, e.g., a mode in which the same route in the upward and downward directions is designated, the above-mentioned control packet is not issued and no new entry is added to the second memory.

The foregoing and other objects, advantages, manners of the operation and novel features of the present invention will be understood from the following detailed description when read in conjunction with the accompanying drawings.

BRIEF DESCRIPTION OF THE DRAWINGS

FIG. 8 is a diagram showing a structure of a home location register 23 indicated in FIG. 1;

FIG. 9 is a diagram exemplifying a structure of a routing register 24 indicated in FIG. 1;

FIG. 10 is a diagram showing a structure of a route policy register 25-A prepared in an origination router 1A indicated in FIG. 3;

FIG. 11 is a diagram showing a structure of a route policy register 25-B prepared in a home agent node 2b indicated in FIG. 3;

FIG. 12 is a diagram showing a structure of a route policy register 25-B prepared in a destination router 1B indicated in FIG. 3;

DESCRIPTION OF THE PREFERRED EMBODIMENTS

The present invention will now be described in detail by way of example with reference to the accompanying drawings.

Figure 2:
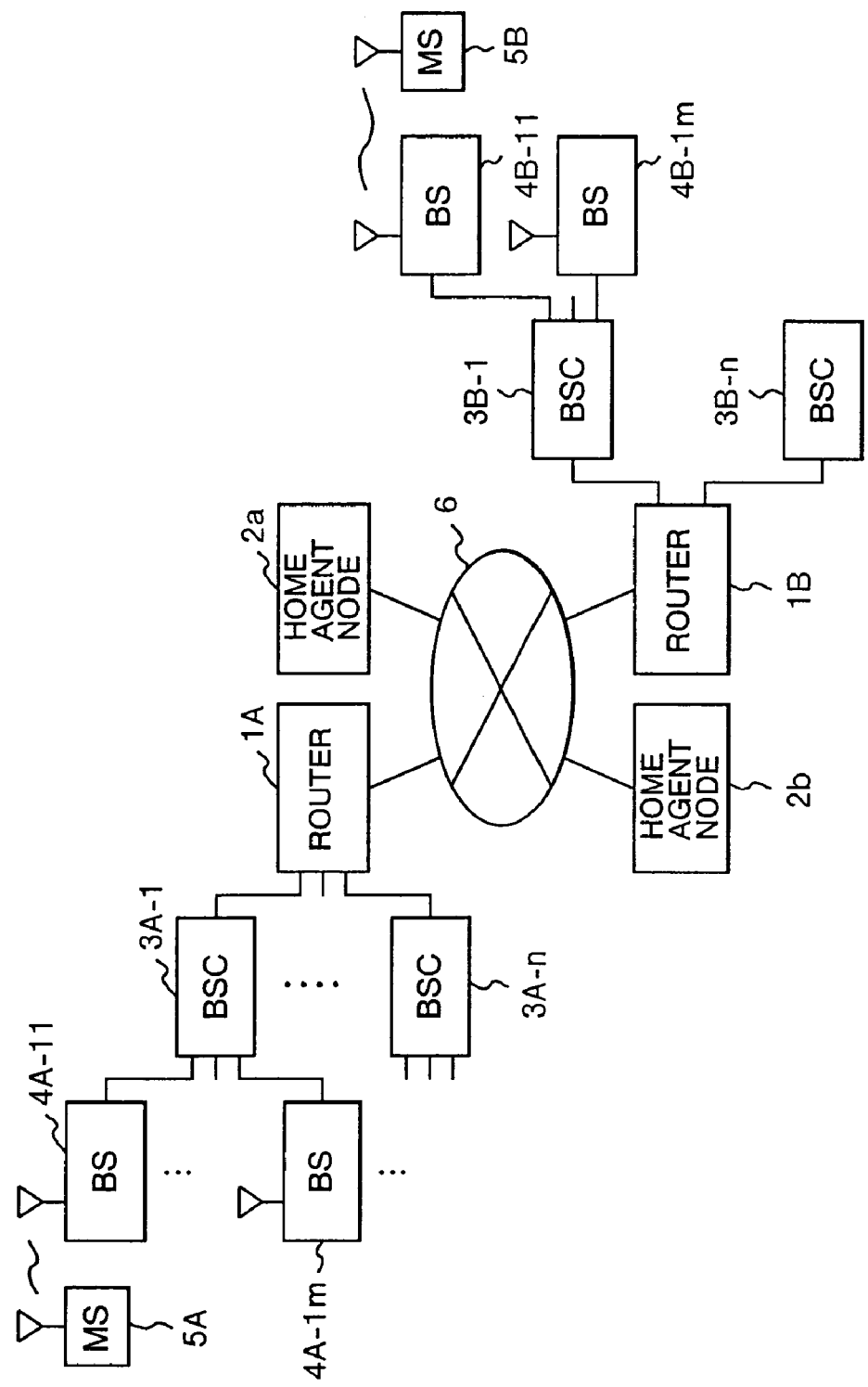
FIG. 2 is a diagram showing an example of a mobile communication system in an application of the present invention.

Referring to FIG. 2, there is shown an example of a mobile communication system in an application of the present invention. The mobile communication system comprises a plurality of mobile terminals 5 (5A, 5B), a plurality of wireless base stations 4 (4A-11 to 4B-1m) communicating with each mobile terminal 5 located in a cell through a radio channel, a plurality of base station controllers 3 (3A-1 to 3B-n) connected with these wireless base stations, a plurality of node apparatuses 1 (1A, 1B) for connecting these base station controllers 3 to a network 6, and a plurality of home agent nodes 2 (2a, 2b) connected with the network 6. Although there is shown a single network in FIG. 2, the network 6 actually includes a multiplicity of interconnected networks and provides a plurality of routes between node apparatuses in an IP networking arrangement. The following describes packet communication to be carried out between the mobile terminals 5A and 5B, but it should be understood that the present invention is also applicable to packet communication between each of these mobile terminals and a stationary terminal not shown in FIG. 2.

For home registration, each mobile terminal 5 is registered in any home agent node 2. Receiving information from the wireless base station 4 covering the current location of each mobile terminal, each home agent node knows the current location of the mobile terminal to be managed thereby. When the home agent node receives a packet addressed to a mobile terminal for which home registration has been made, the home agent node transfers the received packet to the node apparatus 1 accommodating the wireless base station 4 covering the current location of the mobile terminal.

The node apparatus 1 for connecting the base controller 3 to the network 6 is comprised of a router which performs destination control at a network layer level, dynamically updates a routing table through node-to-node exchange of routing information, and selects an optimum communication route. It should be noted that the above-mentioned node apparatus may be comprised of a brouter capable of performing a router function and a bridge function for relaying undefined received packets at a data link layer level.

In the following description, it is assumed that home registrations of the mobile terminals 5A and 5B have been made in the home agent nodes 2a and 2b, respectively. Explained below are communication procedures and node operations to be carried out according to the present invention in a situation where the mobile terminal 5A sends IP packets to the mobile terminal 5B. Herein, the IP addresses of the origination mobile terminal 5A and the destination mobile terminal 5B are represented by "A" and "B", respectively. The node apparatus 1A is referred to as an origination router, and the node apparatus 1B is referred to as a destination router.

Figure 3:
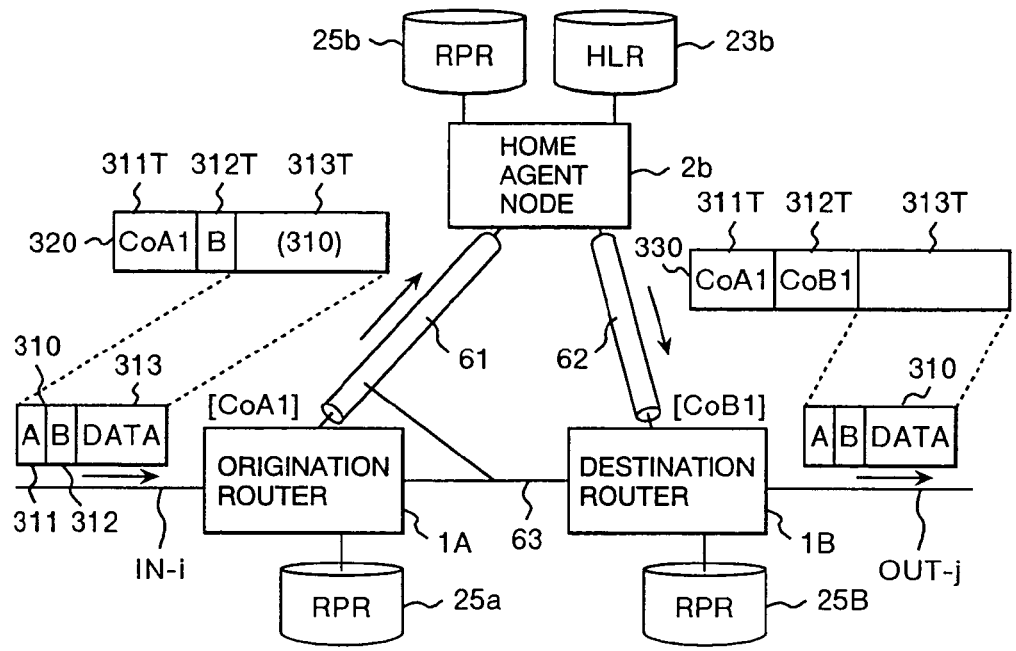
FIG. 3 is an explanatory diagram illustrating a format conversion process for packets to be transferred from an origination node to a destination node.

Referring to FIG. 3, there is shown a packet format conversion process to be performed when the first IP packet 310 addressed from the origination mobile terminal 5A to the destination mobile terminal 5B is transferred from the origination router 1A to the destination router 1B via the destination home agent node 2b.

As will be explained more fully hereinafter, packet format conversion is made using a route policy register (RPR) 25 (25A, 25B, 25b) provided for each of the nodes 1A, 1B and 2b in cooperation with a home location register (HLR) 23b provided for the destination home agent node 2b.

According to the present invention, for communication between particular terminals identified by a combination of a source address SA and a destination address DA of an IP packet, a header processing rule (route policy) for received packets is defined and registered beforehand in each route policy register (RPR) 25 in the origination node (origination router), home agent node, and destination node (destination router), thereby to transfer each IP packet through a specific transmission route.

As typical examples of route policies, there are a "upward/downward same route" policy and a "shortcut route" policy. According to the "upward/downward same route" policy, a route for downward packets transmitted from the origination mobile terminal to the destination mobile terminal and a route for upward packets transmitted from the destination mobile terminal to the origination mobile terminal are formed through the same home agent node. According to the "shortcut route" policy, each of routes for upward and downward packets is formed as an optimum route without regard to the home agent node.

In FIG. 3, a basic communication procedure in accordance with the present invention is shown which is applicable to both the above two route policies.

An IP packet 310 sent out from the origination mobile terminal 5A comprises a data field (payload part) 313 and an IP header. A source address field (SA) 311 of the IP header contains address "A" of the origination mobile terminal 5A, and a destination IP address field (DA) 312 contains address "B" of the destination mobile terminal 5B. In addition to the IP addresses, the IP header contains a variety of information such as IP header length, total length of IP datagram, type-of-service code, and protocol number code. Since information other than the IP addresses is of no direct interest to the present invention and therefore not shown in FIG. 3.

When the origination router 1A receives the IP packet 310 through an input port IN-i, the origination router 1A generates an encapsulation header according to a conversion rule defined in the route policy register 25A. By using the encapsulation header, the origination router 1A converts the received IP packet 310 into an encapsulated packet 320, and transfers the encapsulated packet 320 to destination home agent node 2b by tunneling method.

The encapsulated packet 320 comprises a data field 313T and an encapsulation header. The data field 313T contains the received IP packet 310, and a source address field 311T of the encapsulation header contains a connection port IP address "CoA1" for a transmission path 61 to the destination home agent node 2b. In FIG. 3, the transmission path 61 is indicated as a single-pipe symbol meaning a tunnel, but in an actual network, the transmission path 61, i.e., tunnel 61 is formed as a complicated path extending through a plurality of other nodes.

In a case where the origination router 1A already knows an IP address "XX" of the destination home agent node 2b, the IP address "XX" is set in a destination address field 312T of the encapsulated packet 320. If the IP address "XX" of the destination home agent node 2b is unknown, the destination IP address "B" of the received IP packet 310 is set in the destination address field 312T instead of the IP address "XX". Even in the latter case, through normal IP routing by each of node apparatuses located on the transmission path, the packet 320 can reach the destination home agent node 2b properly.

The destination home agent node 2b and the destination router 1B are connected over a transmission path 62. It is herein assumed in the destination router 1B that a connection port IP address for the transmission path 62 is "CoB1". When the destination home agent node 2b receives the encapsulated packet 320, the destination home agent node 2b replaces the contents of the destination address field 312 with "CoB1" while keeping the contents of the encapsulation header source address field 311T intact. Then, the destination home agent node 2b sends out an encapsulated packet 330 thus formed to the transmission path 62.

In this case, correspondence relationship between the destination address "B" of the received packet 320 and the destination address "CoB1" to be set in the outgoing packet 330 is predefined in the home location register 23b. Further, conversion from the received packet 320 to the outgoing packet 330 is carried out according to the header processing rule predefined in the route policy register 25b.

Upon receiving the encapsulated packet 330, the destination router 1B extracts the IP packet 310 from the data field 313T, and sends out the extracted IP packet 310 to an output port OUT-j connected with the base station controller 3B-1 which accommodates the wireless base station 4B-11 covering the current location of the destination mobile terminal 5B.

Figure 4:
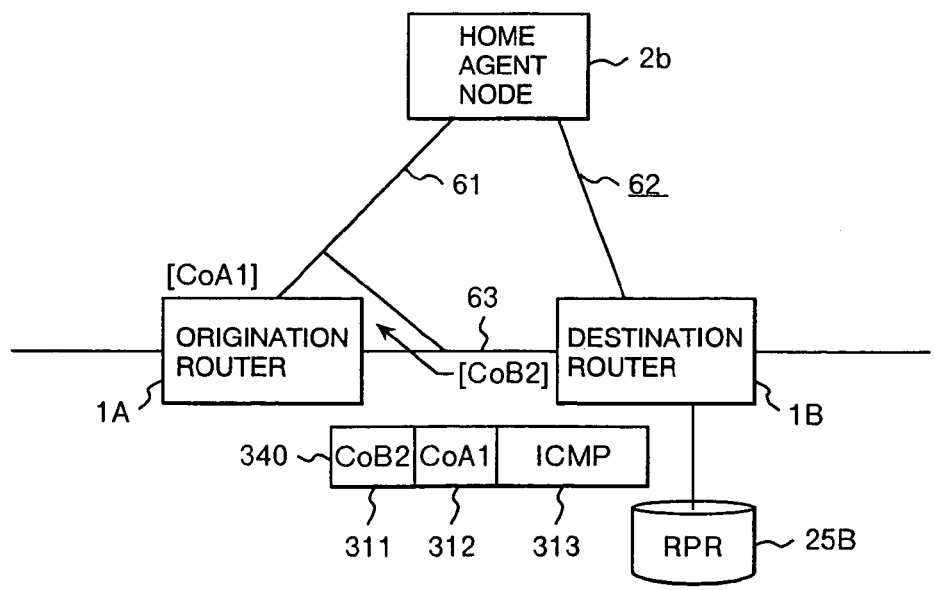
FIG. 4 is an explanatory diagram illustrating an ICMP redirect message packet to be sent from the destination node to the origination node when shortcut routing is designated in the present invention.

Referring to FIG. 4, there is shown a diagram for explanation of operations to be performed by the destination router 1B in a case where the "shortcut route" policy is specified in the route policy register 25B for communication of the above-mentioned IP addresses "A" and "B".

In this case, in response to reception of the encapsulated packet 330, the destination router 1B generates a control IP packet 340 containing a control message for requesting a communication route change, for example, an ICMP (Internet Control Message Protocol) redirect message to the origination router 1A, and sends out the control IP packet 340 to a transmission path 63. The control IP packet 340 contains the origination router IP address "CoA1" in a destination address field 312, and a connection port IP address "CoB2" for the transmission path 63 in a source address field 311.

The conversion of the IP packet 310 from the encapsulated packet 330 as described with reference to FIG. 3, and the generation of the ICMP message as indicated in FIG. 4, are carried out according to the header processing rule predefined in the route policy register 25B in combination with an ICMP flag.

In the present invention, as described above, the origination router 1A encapsulates the received packet 310, and the source address 311T contained in the encapsulation header is relayed by the destination home agent node 2b so that the destination router 1B is informed of the IP address of the origination router 1A ("CoA1" in the present preferred embodiment).

Therefore, when packets addressed from the destination mobile terminal 5B to the origination mobile terminal 5A are transferred by the destination router 1B to the origination router 1A, the destination router 1B can use the IP address of the origination router 1A to transmit the packets by tunneling transmission through a shortcut route without intervention of the origination home agent node 2a.

Further, using the IP address of the origination router 1A, the destination router 1B can send the ICMP redirect message to the origination router 1A for letting the origination router 1A know the IP address "CoB2" of the destination router 1B. Accordingly, by using the IP address of the destination router 1B, tunneling packet transmission can be made in the direction from the origination router 1A to the destination router 1B.

Figure 5:
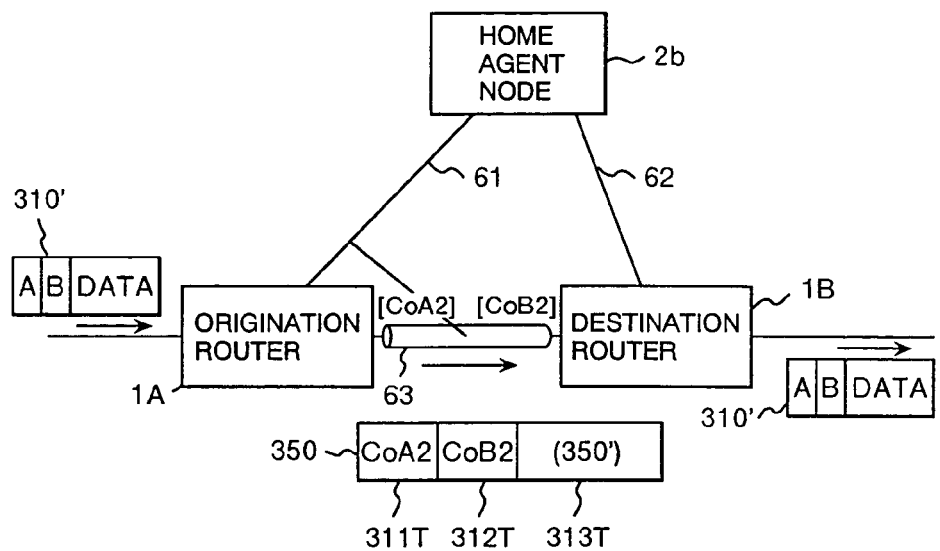
FIG. 5 is an explanatory diagram illustrating a format conversion process for packets to be sent from the origination node to the destination node through tunneling communication in the result of shortcut route selection.

Referring to FIG. 5, there is shown a diagram for explanation of operations to be performed by the origination router 1A after receiving the ICMP redirect message.

When the origination router 1A receives an IP packet 310' from the mobile terminal 5A, the origination router 1A converts the IP packet 310' into an encapsulated packet 350. Then, the origination router 1A carries out tunneling communication with the destination router 1B through the shortcut route 63 without intervention of the destination home agent node 2b. The encapsulated packet 350 has a data field 313T containing the received IP packet 310', and an encapsulation header in which the destination address field 312T contains the destination router IP address "CoB2" and the source address field 311T contains a connection port IP address "CoA2" for the shortcut route 63.

Figure 6:
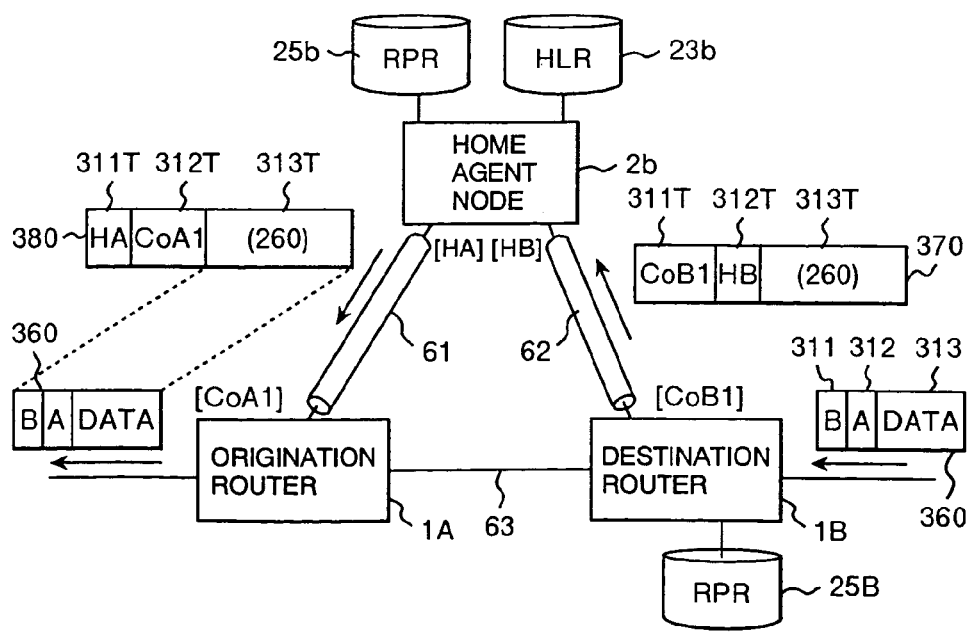
FIG. 6 is an explanatory diagram illustrating a format conversion process for packets to be sent from the destination node to the origination node through tunneling communication when the same route in the upward and downward directions is designated in the present invention.

Referring to FIG. 6, there is shown a diagram for explanation of operations to be performed by each node when the "upward/downward same route" policy is specified for communications between the IP addresses "A" and "B".

Under direction of the "upward/downward same route" policy, when the destination router 1B receives the first encapsulated packet 330 indicated in FIG. 3, the destination router 1B does not issue the ICMP redirect message 340. At this step, therefore, the origination router 1A encapsulates a subsequent packet, which is addressed from the origination mobile terminal 5A to the destination mobile terminal 5B, in the same manner as for the packet 310 received first. Then, the origination router 1A carries out tunneling communication with the destination home agent node 2b through the transmission path 61.

Upon receiving the above encapsulated packet, the destination home agent node 2b performs header conversion according to the same rule as that for the conversion from the packet 320 to the packet 330 as described with reference to FIG. 3. Then, the destination home agent node 2b carries out tunneling communication with the destination router 1B through the transmission path 62. When the destination router 1B receives the encapsulated packet from the destination home agent node 2b, the destination router 1B removes the encapsulation header and sends the IP packet contained in the data field 313T to the transmission path OUT-j.

On the other hand, when the destination router 1B receives an IP packet 360 addressed from the destination mobile terminal 5B to the origination mobile terminal 5A, the destination router 1B encapsulates the received packet 360 to form an encapsulated packet 370. Then, the destination router 1B sends the encapsulated packet 370 to the destination home agent node 2b through tunneling communication over the transmission path 62. In this case, for example, the connection port IP address "CoB1" for the transmission path 62 at the destination router 1B is set in a source address field 311T of the encapsulation header, and a connection port IP address "HB" for the transmission path 62 at the destination home agent node 1b is set in a destination address field 312T thereof.

Under normal communication condition, the destination router 1B receives packets containing mobile terminal location information from wireless base stations through the base station controllers 3B-1 to 3B-n, and transfers the received packets to each home agent node. Therefore, the destination router 1B already knows the IP addresses "CoB1" and "HB" at both ends of the transmission path 62 for tunneling communication.

Upon receiving the encapsulated packet 370, the destination home agent node 2b rewrites the contents of the source address field 311T and the destination address field 312T of the encapsulation header to form an encapsulated packet 380. The destination home agent node 2b transfers the encapsulated packet 380 to the origination router 1A through the transmission path 61. The encapsulated packet 380 includes, for example, a connection port IP address "HA" for the transmission path 61 at the destination home agent node 2b in a source address field 311T thereof, and the connection port IP address "CoA1" for the transmission path 61 at the destination router 1B in a destination address field 312T thereof. As to the transmission path 61, the connection port IP addresses at both ends thereof are already known when the first encapsulated packet 320 is received as described with reference to FIG. 3.

When the origination router 1A receives the encapsulated packet 380, the origination router 1A removes the encapsulation header. Then, the IP packet 360 extracted from a data field 313T of the encapsulated packet 380 is transferred to an output port for the mobile terminal 5A. In this case, the operations of the origination router 1A are performed in the same manner as those in the destination router 1B at the time of reception of downward packets, i.e., the origination router 1A does not issue the ICMP redirect message.

Figure 1:
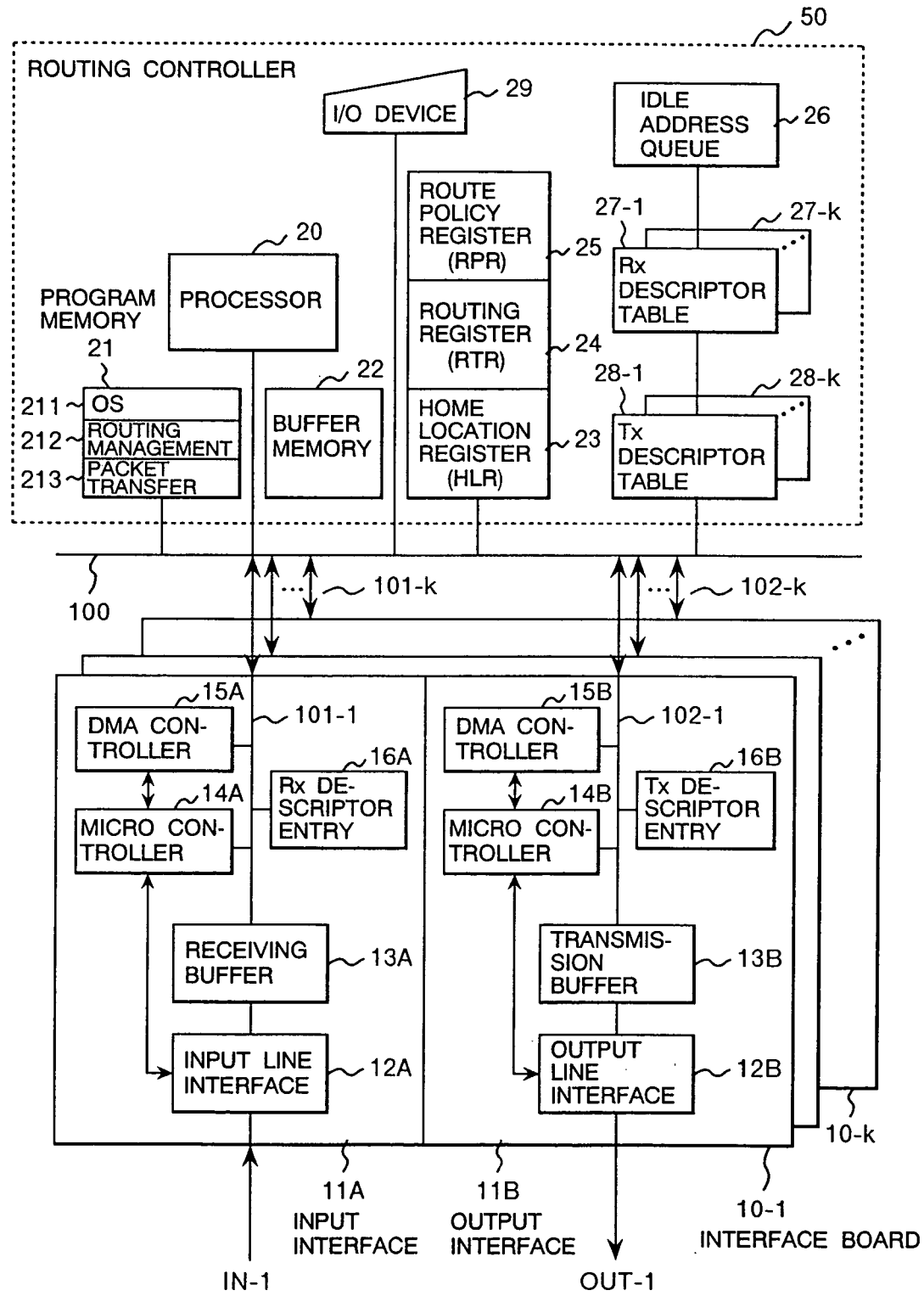
FIG. 1 is a block diagram showing a preferred embodiment of a node apparatus according to the present invention.

Referring to FIG. 1, there is shown a preferred embodiment of a node apparatus for implementing the above-mentioned communication functions according to the present invention.

The node apparatus shown in FIG. 1 is provided with a home location register 23, which is an element required for working the node apparatus as the home agent node 2. Where the node apparatus is used as the origination router 1A or destination router 1B, the home location register 23 is not required.

The node apparatus comprises a plurality interface boards 10-i (i=1 to k), each having a pair of input and output ports IN-i and OUT-i, and a routing controller 50 connected with each interface board 10-i through a bus 100.

The routing controller 50 comprises a processor 20, a program memory 21, a buffer memory (BM) 22 for storing packets received through each of the interface boards 10-i, a memory including a home location register (HLR) 23, a routing register (RTR) 24 and a route policy register (RPR) 25, a memory including an idle address queue 26, an Rx (reception) descriptor table 27-i (i=1 to k) and a Tx (transmission) descriptor table 28-i (i=1 to k), and an input/output device 29. These elements are connected with the bus 100.

The program memory 21 contains an OS 211 and a variety of programs to be carried out by the processor 20. As programs specific to the node apparatus, there are provided a routing management program 212 for dynamically updating the contents of the routing register 24, and a packet transfer program 213 for conducting packet communication unique to the present invention by referencing to the routing register 24, the route policy register 25 and the home location register 23 (in use as the home agent node) as will be described later. In a case where the node apparatus constitutes the home agent node 1a or 1b, the program memory 21 also contains a program for managing mobile terminal location information according to a location registration protocol. However, since mobile terminal location information management itself is of no direct interest of the present invention, it will not be further discussed here.

The buffer memory (BM) 22 is divided into a plurality of fixed-length memory blocks (memory areas), and the idle address queue 26 contains the head address of each of memory blocks that is free in the buffer memory. The Rx descriptor tables 27 (27-1 to 27-k) and the Tx descriptor tables 28 (28-1 to 28-k) are prepared one pair for every interface board 10 (10-1 to 10-k). The "i"th interface board 10-i uses the "i"th Rx descriptor table 27-i and the "i"th Tx descriptor table 28-i.

Each interface board 10-i comprises an input interface 11A and an output interface 11B.

The input interface 11A comprises an input bus 101-i connected with the bus 100, an input line interface 12A connected with the input port IN-i, a receiving buffer 13A connected between the input line interface 12A and the input bus 101-i, and a microcontroller 14A, a DMA controller 15A and an Rx descriptor entry memory 16A connected with the input bus 101-i.

A signal received from the input port IN-i is terminated at the input line interface 12A so as to be temporarily stored in the receiving buffer 13A as a received packet (IP packet or encapsulated packet). The received packet thus stored in the receiving buffer 13A is fed to the buffer memory 22 through the DMA controller 15A under the control of the microcontroller 14A. At this step of operation, an address Ax is taken out of the idle address queue 26 and used as a write address WA for the received packet. Then, the address Ax is registered into the Rx descriptor table 27-i together with a flag bit indicating the validity of entry.

The processor 20 in the routing controller 50 accesses the Rx descriptor tables 27-1 to 27-k circularly to read out the received packet from the buffer memory 22 according to the address Ax registered in the accessed Rx descriptor table 27-i. As will be described in detail later, the processor 20 refers to the route policy register (RPR) 25 based on the combination of the addresses SA and DA contained in the IP header of the received packet. Then, using a header processing rule specified by the route policy register 25, the processor 20 carries out encapsulation header generation or address conversion, and forms judgment on an output port number by referring to the routing register (RTR) 24.

When an output port number "j" is determined for the received packet, the processor 20 registers the address Ax of the received packet into the "j"-th Tx descriptor table 28-j. Then, the processor 20 rewrites the flag bits of the entries containing the address Ax in the Rx descriptor table 27-i and the Tx descriptor table 28-j.

The output interface 11B of each interface board 10-i comprises an output bus 102-i connected with the bus 100, an output line interface 12B connected with the output port OUT-i, a transmission buffer 13B connected between the output line interface 12B and the output bus 102-i, and a microcontroller 14B, a DMA controller 15B and a Tx descriptor entry memory 16B connected with the output bus 102-i.

The received packet stored in the buffer memory 22 is fed as an outgoing packet to the transmission buffer 13B through the DMA controller 15B under the control of the microcontroller 14B. At this step of operation, the Tx descriptor table 28-i corresponding to the interface board 10-i is referred to so that the address Ax registered in the Tx descriptor table 28-i is used as a read address RA for the received packet.

Figure 7:
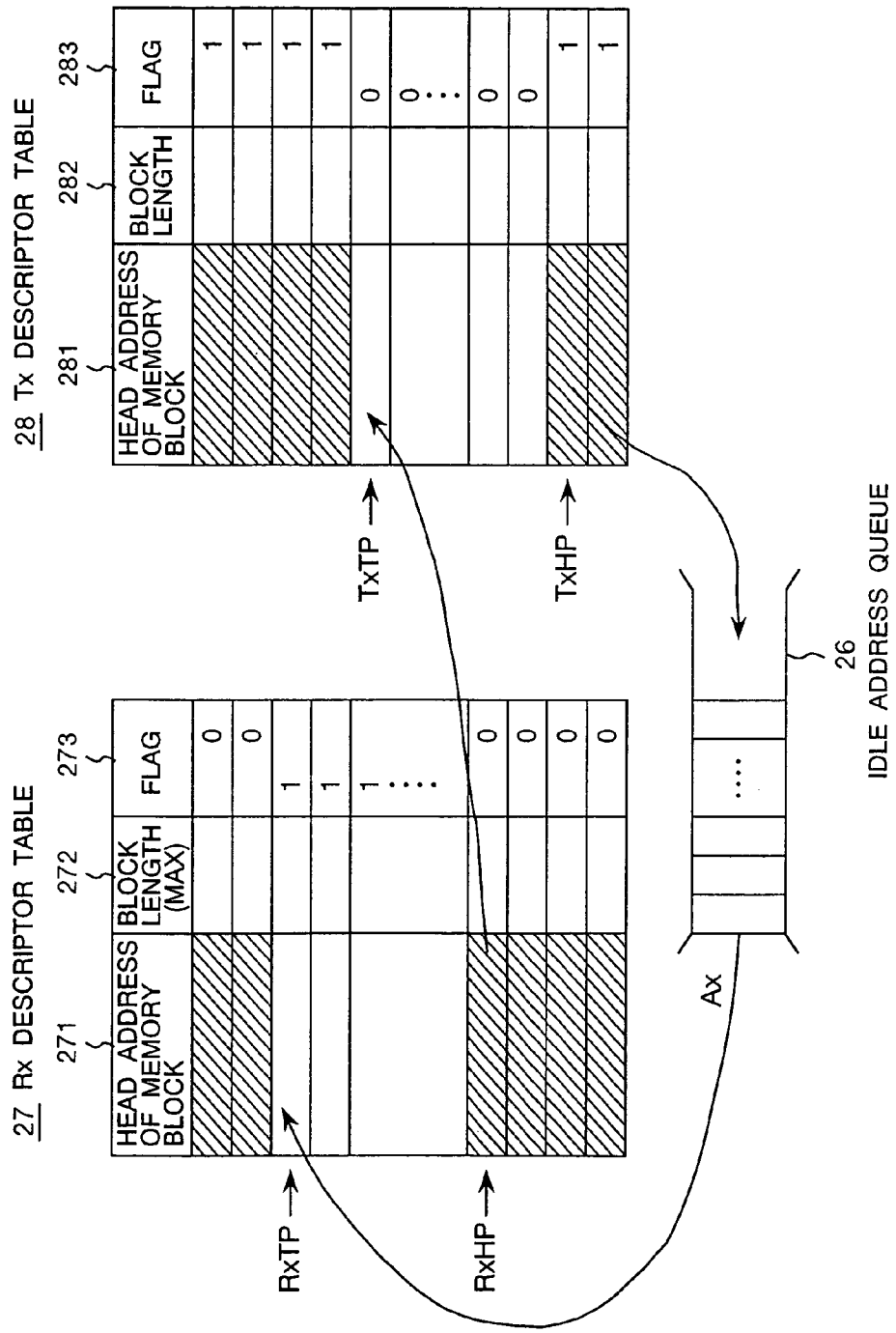
FIG. 7 is an explanatory diagram illustrating relationship among an idle address queue 26, an Rx descriptor table 27 and a Tx descriptor table 28 in the node apparatus indicated in FIG. 1.

Referring to FIG. 7, there is shown an explanatory diagram illustrating relationship among the idle address queue 26, the Rx descriptor table 27 (27-1 to 27-k), and the Tx descriptor table 28 (28-1 to 28-k).

The Rx descriptor table 27 comprises a plurality of entry areas, each including a head address 271 of a memory block, a block length 272 and a flag bit 273 indicating the validity of entry. Similarly, the Tx descriptor table 28 comprises a plurality of entry areas, each including a head address 281 of a memory block, a packet length 282 and a flag bit 283 indicating the validity of entry.

Entry data is written into and read out from these descriptor tables in a circular fashion that the last entry area of each table is followed by the first entry area thereof. In FIG. 7, each of hatched portions indicates an entry area containing valid data, and an entry located at the top one of valid entry areas is specified by a pointer RxHP or TxHP. A pointer RxTP and TxTP are used to specify an entry position immediately following the valid entry areas. Therefore, new entry data is written into an entry area specified by the pointer RxTP or TxTP, and any already registered entry data is read out of an entry area specified by the pointer RxHP or TxHP. A value of each of these pointers is incremented each time entry data is written into or read out from each of the descriptor tables.

For each of valid entry areas in the Rx descriptor table 27, a flag 273 indicating a bit value "0" is set up. For each of invalid entry areas in the Rx descriptor table 27, i.e., an entry area which allows writing new data, a flag 273 indicating a bit value "1" is set up. In contrast, for each of valid entry areas in the Tx descriptor table 28, a flag 283 indicating a bit value "1" is set up. For each of invalid areas in the Tx descriptor table 28, a flag 283 indicating a bit value "0" is set up.

The input interface 11A of the interface board **10-*i* reads out the contents of an entry specified by the pointer RxTP in the corresponding Rx descriptor table 27-*i* into the Rx descriptor entry memory 16A. Then, after confirming that the flag 273 is set to "1", the input interface 11A writes the received packet into the buffer memory 22 according to the write address WA which corresponds to the idle address Ax taken out of the idle address queue 26. Thereafter, the address Ax is registered into the entry specified by the pointer RxTP in the Rx descriptor table 27-*i*, the flag 273** is changed to "0", and a value of the pointer RxTP is incremented.

The processor 20 of the routing controller 50 reads out the received packet from the buffer memory 22 based on the address Ax registered in an entry specified by the pointer RxHP in the Rx descriptor table **27-*i*, and then the processor 20** carried out predetermined processing on the received packet.

When an output port "j" to which the received packed should be transferred is identified, the processor 20 checks the state of the flag 283 of an entry specified by the pointer TxTP in the Tx descriptor table **27-*j*. Then, the address Ax is registered into the address field 281, the flag 283 is changed to "1", and a value of the pointer TxTP is incremented. In the same manner, for an already processed entry specified by the pointer RxHP in the Rx descriptor table 27-*i*, the flag 273** is changed to "1" and a value of the pointer RxHP is incremented.

The output interface 11B of the interface board **10-*j* reads out the contents of an entry specified by the TxHP in the corresponding Tx descriptor table 28-*j* into the Tx descriptor entry memory 16B. Then, after confirming that the flag is set to "1", the output interface 11B reads out a packet from the buffer memory 22 based on the address Ax registered in the address field 281, and transfers the packet to the transmission buffer 13B. The address Ax which has just become unnecessary is released to the idle address queue 26. At this step of operation, the flag of the entry specified by the pointer TxHP in the Tx descriptor table 28-*j*** is changed to "0", and a value of the pointer TxHP is incremented.

According to the structure shown in FIG. 1, a plurality of the interface boards 10-1 to **10-*k* operate to write each received packet into the buffer memory 22 based on the idle address Ax taken out of the idle address queue 26 used in common, and to release a read address used therefor to the idle address queue 26 upon completion of reading out of a packet from the buffer memory 22. Therefore, packet exchange operation is carried out while efficiently using the capacity of the buffer memory 22**.

Referring to FIG. 8, there is shown a structure of the home location register (HLR) 23.

The home location register 23 contains a plurality of entries 230-1, 230-2 and so forth, each indicating correspondence relationship between an IP address 231 of a destination mobile terminal and an IP address 232 of a destination router for relaying packets to the destination mobile terminal. According to a destination IP address DA contained in the IP header of each received packet, the processor 20 in the home agent node 2 makes reference to the home location register 23 to find out an IP address 232 of the destination router to which the received packet should be transferred.

Referring to FIG. 9, there is shown a structure of the routing register (RTR) 24.

The routing register (RTR) 24 contains a plurality of entries 240-1, 240-2 and so forth, each indicating correspondence relationship among a destination terminal IP address 241, a next hop IP address 242, an output port number (Tx descriptor identification number) 243, and an output port IP address 244. Addition and update of entries in the routing register 24 are carried out by the routing management program 212.

Referring to FIGS. 10 to 12, there are shown structures of the route policy registers (RPR) 25-A, **25-*b* and 25-B which are prepared in the origination router 1A, the destination home agent node 2*b* and the destination router 1B**, respectively.

Each policy register contains a plurality of entries 250-11, ..., 250-21, ..., and 250-31, ..., each comprising a plurality of fields indicating a source IP address (SA) 251, a destination IP address (DA) 252, a tunneling source address (TSA) 253, a tunneling destination address (TDA) 254, and an ICMP flag 255.

In the fields 253 and 254 of the route policy register 25, header processing rules for encapsulation header generation, address conversion, header removal, etc. are defined in correspondence with a combination of a source address 251 and a destination address 252 of an IP packet. That is, the fields 253 and 254 contain decision rules of source address and destination address for tunneling communication or actual address values for tunneling communication.

In FIGS. 10 to 12, among address decision rules defined in the tunneling destination address (TDA) field 254, "DUP" indicated in the entry 250-11 signifies that a destination IP address 252 of an IP header is to be applied as a tunneling destination address. "CNV" indicated in the entry 250-21 signifies that a destination router IP address 232 determined by referring to the home location register (HLR) 23 in accordance with a destination IP address 252 is to be applied as a tunneling destination address. "NONE" signifies that an IP address of an encapsulated packet is to be removed. Character strings CoB2, CoA1 and HB, not enclosed in double quotes, signify actual IP address values as will be obvious from the description given with reference to FIGS. 3 to 6.

Among address decision rules defined in the tunneling source address (TSA) field 253, "SELF" indicated in the entry 250-11 signifies that an output port IP address 244 determined by referring to the routing register 24 in accordance with a destination address (TDA) 254 is to be applied as a tunneling source address. "KEEP" indicated in the entry 250-21 signifies that a source address contained in an encapsulation header of a received packet is to be applied intactly as a tunneling source address.

In FIG. 10, there is shown a pair of entries 250-11 and 150P-11 having the same combination of source and destination addresses 251 and 252. The "P"-infixed entry 250P-

11 indicates an entry generated after the entry 250-11, i.e., the entry 250P-11 is to be called into execution with precedence over the original entry 250-11.

In FIG. 12, there is shown a pair of entries 250-32 and 250P-32 having the same combination of source and destination addresses 251 and 252. The entry 250-32 is used for the "shortcut route" policy, and the entry 250P-32 is for the "upward/downward same route" policy. In the actual route policy register 25, either one of these two entries is contained.

Figure 13:
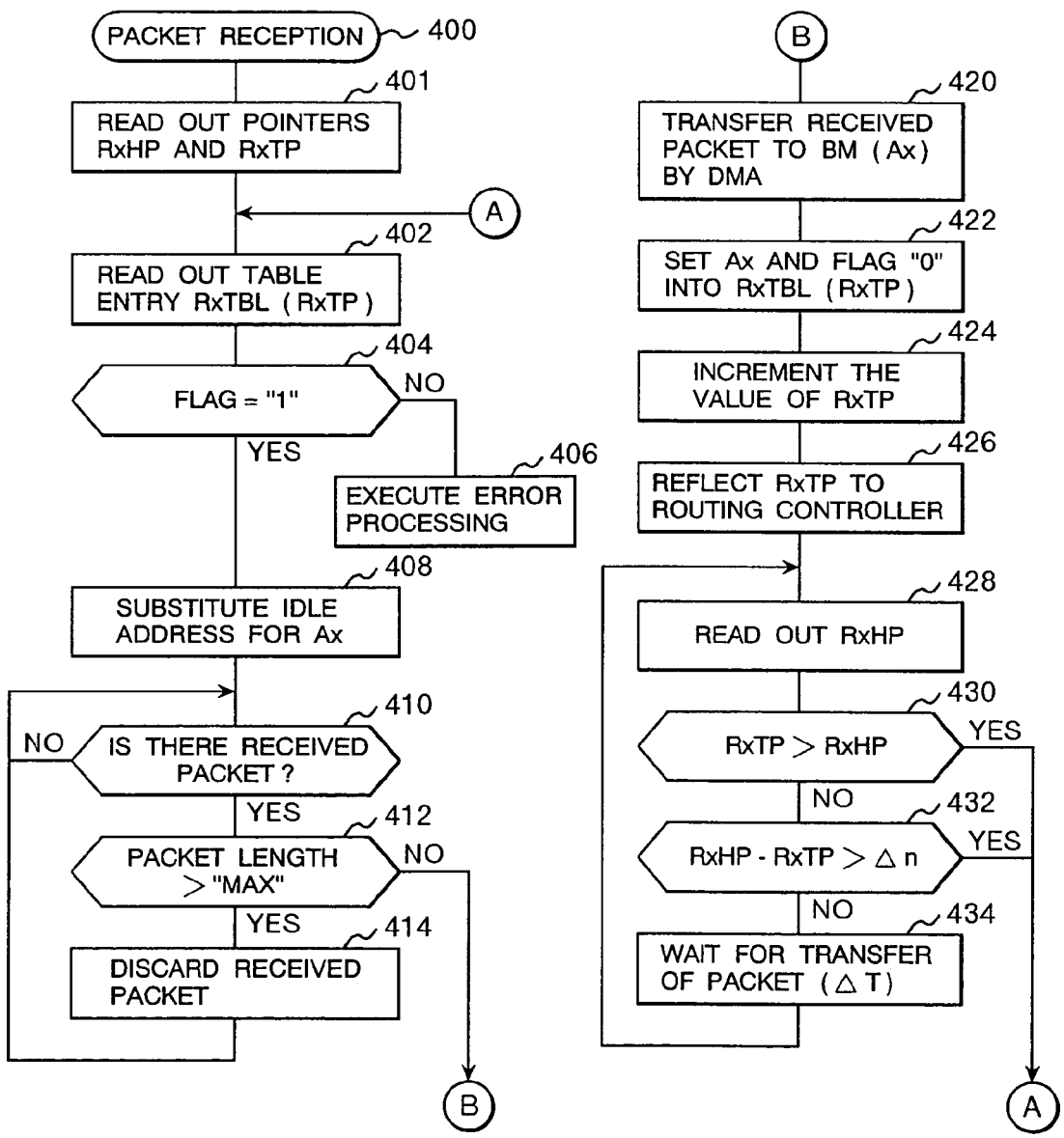
FIG. 13 is a flowchart showing a preferred embodiment of a packet reception processing routine to be carried out by a microcontroller 14A of an input interface 11A indicated in FIG. 1.

Referring to FIG. 13, there is shown a flowchart of a packet reception processing routine to be carried out by the microcontroller 14A in the input interface 11A on each of the interface boards 10-1 to 10-k.

The microcontroller 14A reads out the pointers RxHP and RxTP for the Rx descriptor table 27-i corresponding to the interface board 10-i (step 401). From the Rx descriptor table 27-i, the microcontroller 14A reads out an entry RxTBL (RxTP) indicated by the pointer RxTP into the Rx descriptor entry memory 16A (step 402). Then, the microcontroller 14A checks a flag 273 of the entry RxTBL (RxTP) (step 404). If "0" is indicated in the flag 273, it is judged that an error has occurred in any operation of the microcontroller 14A or the processor 20, and error processing is carried out (step 406).

If "1" is indicated in the flag 273, an idle address Ax is taken out of the idle address queue 26 (step 508). Then, it is checked whether the receiving buffer 13A holds any received packet to be processed (step 410). If the received packet to be processed is stored in the receiving buffer 13A, a packet total length indicated in the header of the received packet is compared with an allowable maximum block size MAX of the entry RxTBL (RxTP) (step 412). If the packet total length of the received packet is larger than the MAX, the received packet is discarded (step 414) and control is returned to step 410 to repeat the above-mentioned judgment on the next received packet.

If the packet total length of the received packet does not exceed the MAX, the microcontroller 14A instructs the DMA controller 15A to perform DMA transfer for feeding the received packet to a memory block BM (Ax) indicated by the address Ax in the buffer memory 22 (step 420). Then, the address Ax and flag "0" are set respectively in the fields 271 and 273 of the entry RxTBL (RxTP) indicated by the pointer RxTP in the Rx descriptor table 27-i (step 422). Further, a value of the pointer RxTP is incremented (step 424), which is reflected to the pointer RxTP stored in the routing controller 50 so that the processor 20 can make reference to the incremented value (step 426).

Thereafter, a value of the pointer RxHP stored in the routing controller 50 is read out (step 428), and the value thus read out is compared with a value of the pointer RxTP (step 430). If the value of the pointer RxTP is larger than the value of the pointer RxHP, control is returned to step 402 to read out the next entry RxTBL (RxTP) in the Rx descriptor table 27-i.

If the value of the pointer RxTP is not larger than the value of the pointer RxHP, i.e., if the valid entry area is not contiguous as shown in FIG. 7, it is necessary to prevent double data writing to the valid entry area indicated by the pointer RxHP. For this purpose, a judgment is formed to check whether there is a predetermined amount of space Δn between the RxTP and RxHP (step 432). If the space between the RxTP and RxHP is larger than Δn, control is returned to step 402. If the space between the RxTP and RxHP is not larger than Δn, a predetermined wait time ΔT is taken in transfer of the received packet (step 434), and then step 428 and operations subsequent thereto are repeated. Upon completion of processing the received packet by the processor 20, the value of the RxHP is incremented to make the space between the RxTP and RxHP larger than Δn. Therefore, control can be returned to step 402.

In the present preferred embodiment mentioned above, if the packet total length of a received packet is larger than the block size MAX in the buffer memory 22, the received packet is discarded (step 414). This operation is based on the premise that each block in the buffer memory 22 has a size sufficient for storing a normal packet and that a received packet having a length exceeding the block size MAX can be judged abnormal. However, if the block size MAX is increased, unused segments are produced in each block of the buffer memory in the processing of received packets having average lengths, resulting in a decrease in the usage rate of the capacity of the buffer memory. For efficient use of the capacity of the buffer memory, it is preferable to provide such an arrangement that the block size MAX is made equal to an average packet length and a plurality of blocks are used for storing a received packet having an exceptional length exceeding the MAX.

Figure 14:
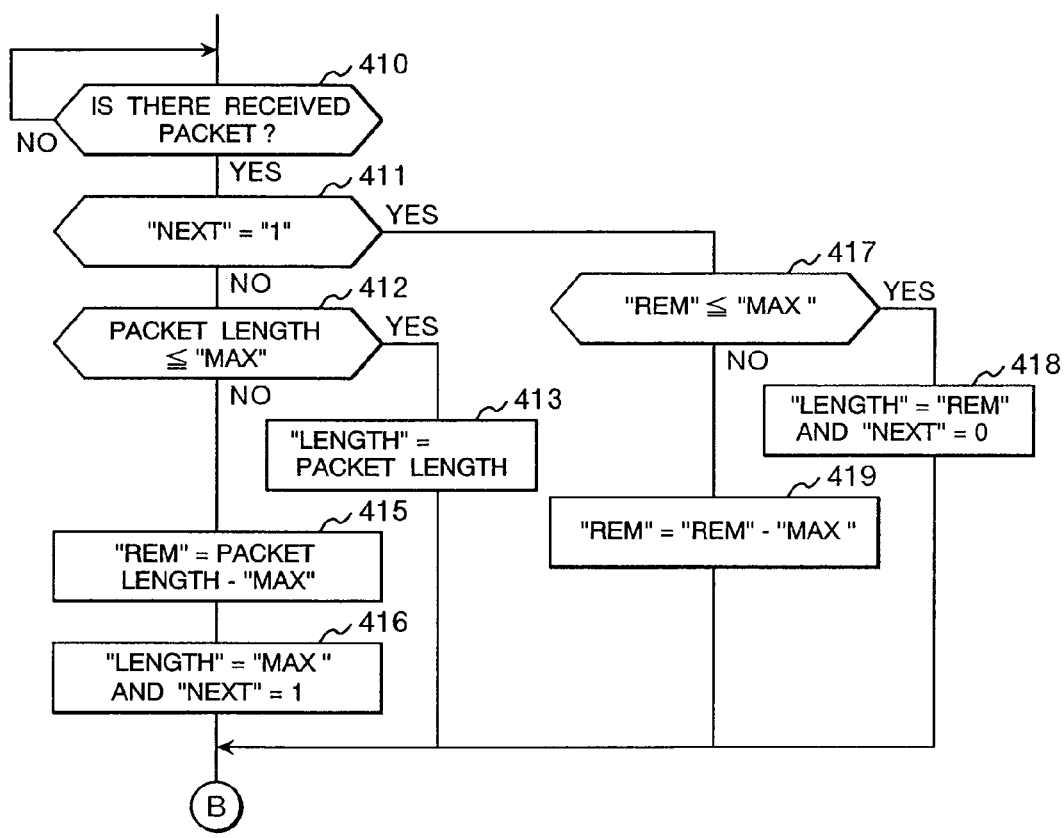
FIG. 14 is a flowchart showing a modified embodiment of the packet reception processing routine presented in FIG. 13.

Referring to FIG. 14, there is shown a control flow to be carried out in lieu of the routine part of steps 412 to 414 shown in FIG. 13 in a case where a plurality of blocks are used for storing a received packet.

When a received packet is found (step 410), a value of a parameter NEXT is checked (step 411). The parameter NEXT is provided to indicate whether the received packet has any remaining data block or not. If the total length of the received packet exceeds the block size MAX, the parameter NEXT is set to "1". At a point of time when the processing proceeds to handling a new packet received, the parameter NEXT is reset to "0".

If the parameter NEXT indicates "0", the total length of the received packet is compared with the block size MAX (step 412). Then, if it is found that the total length of the received packet does not exceed the MAX, the total length of the received packet is set in a parameter LENGTH indicating a data length for DMA transfer (step 413). Thereafter, DMA transfer is performed to feed the received packet to the buffer memory 22 (step 420 in FIG. 13).

If the total length of the received packet exceeds the MAX, the MAX is subtracted from the total length of the received packet and a resultant value of subtraction is set in a parameter REM indicating the remaining data block length (step 415). Then, the MAX is set in the parameter LENGTH and the parameter NEXT is set to "1" (step 416). Thereafter DMA transfer is performed to feed the first data block part of the received packet to the buffer memory 22.

When control is returned to step 411 in a state that the parameter NEXT indicates "1", the remaining data block length parameter REM is compared with the block size MAX (step 417). If a value of the remaining data length parameter REM is larger than the block size MAX, a value obtained by subtraction "REM−MAX" is set in the REM (step 419) and DMA transfer is performed to feed the next data block part of the received packet to the buffer memory 22. If the value of the REM is not larger than the MAX, the value of the REM is set in the parameter LENGTH and the parameter NEXT is reset to "0" (step 418). Thereafter, DMA transfer is performed to feed the remaining data block part of the received packet to the buffer memory 22.

Figure 15:
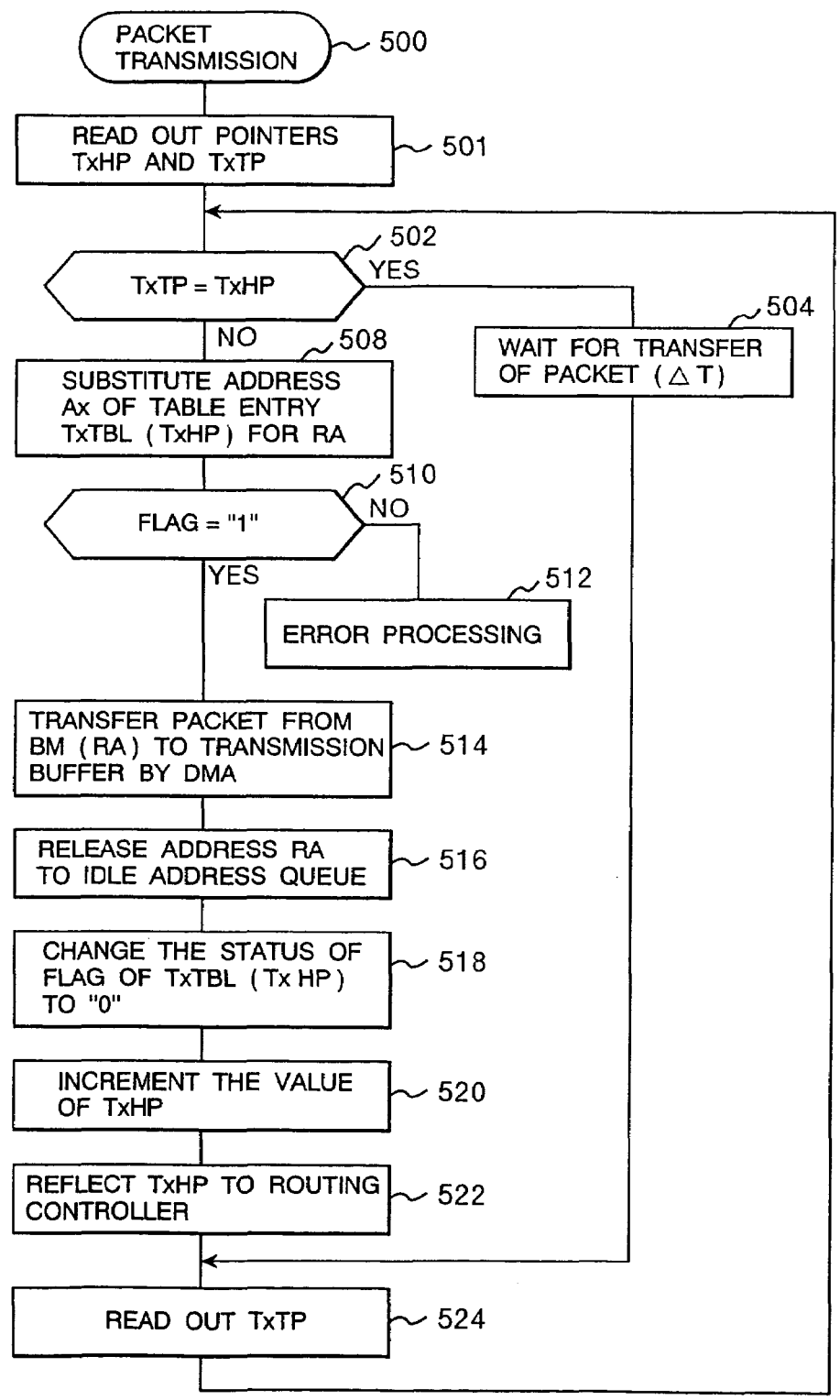
FIG. 15 is a flowchart showing a preferred embodiment of a packet transmission processing routine to be carried out by a microcontroller 14B of an output interface 11B indicated in FIG. 1.

Referring to FIG. 15, there is shown a flowchart of a packet transmission processing routine to be carried out by the microcontroller 14B in the input interface 11B on each of the interface boards 10-1 to 10-k.

The microcontroller 14B reads out the pointers TxHP and TxTP for the Tx descriptor table 28-*i* corresponding to the interface board 10-*i* (step 501). Then, the microcontroller 14B checks whether the pointers TxTP and TxHP have the same value (step 502). In the initial state, the pointers TxTP and TxHP have the same value indicating the first entry area of the Tx descriptor table 28-*i*. If any entry containing valid data is left in the Tx descriptor table, the pointers TxTP and TxHP have different values.

The condition "TxTP=TxHP" signifies that no entry containing valid data is left in the Tx descriptor table. Therefore, if the pointers TxTP and TxHP have the same value, the microcontroller 14B waits for a predetermined period of time ΔT expecting that the processor 20 transfers a new packet into the Tx descriptor table 28-*i* (step 504). Then, the pointer TxTP is read again (step 524), and control is returned to stop 502 to check whether the pointers TxTP and TxHP have the same value.

If the pointers TxTP and TxHP have different values, an entry TxTBL (TxHP) indicated by the pointer TxHP of the Tx descriptor table 28-*i* is read into the Tx descriptor entry memory 16B. Then, an address Ax registered in the entry field 281 of the entry thus read out is set as a read address RA (step 508).

A judgment is formed to check the flag 283 of the above entry (step 510). If "0" is indicated in the flag 283, error processing is carried out (step 512). If "1" is indicated in the flag 273, the DMA controller 15B is instructed to perform DMA transfer so that an outgoing packet stored in a memory block BM (RA) indicated by the address RA in the buffer memory 22 is transferred to the transmission buffer 13B (step 514). Then, the address Ax (=RA) which has become unnecessary is released to the idle address queue 26 (step 516). In the Tx descriptor table 28-*i*, the flag 283 of the entry TxTBL (TxHP) is reset to "0" (step 518), and a value of the pointer TxHP is incremented (step 520). Then, the incremented value is reflected to the pointer TxHP stored in the routing controller 50 so that the processor 20 can make reference to the incremented value (step 522). Thereafter, a value of the TxTP for the Tx descriptor table 28-*i* is read out (step 524), and control is returned to step 502.

Figure 16:
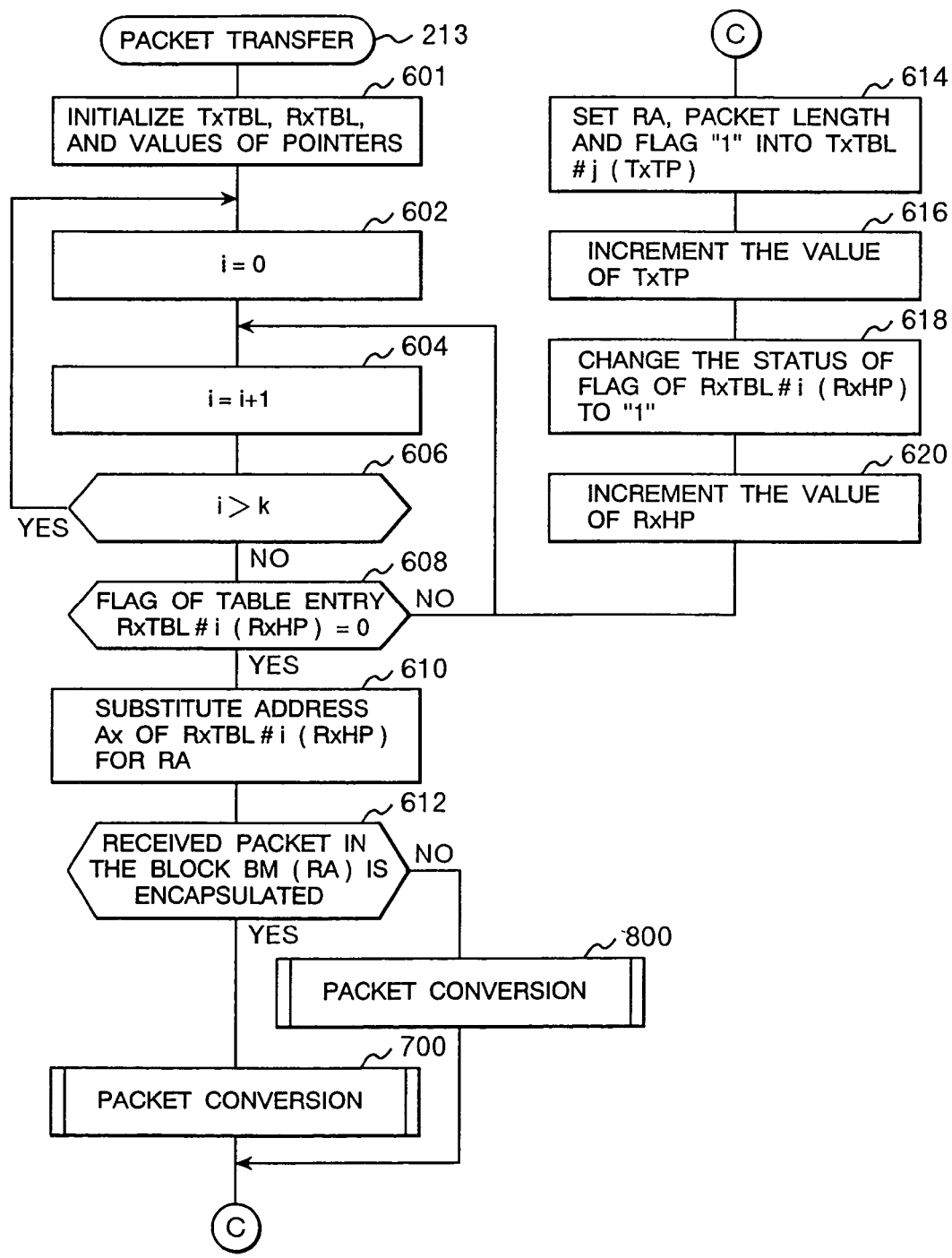
FIG. 16 is a flowchart showing a preferred embodiment of a received packet transfer processing routine 213 to be carried out by a processor 20 of a routing controller 50 indicated in FIG. 1.

Referring to FIG. 16, there is shown a flowchart of a packet transfer processing routine 213 to be carried out by the processor 20 of the routing controller 50.

In execution of this routine, the Rx descriptor table (RxTBL) 27-*i* (i=1 to k), the Tx descriptor table (TxTBL) 27-*i* (i=1 to k), and values of pointers therefor are initialized (step 601), and then a value of parameter i for identifying one of the Rx descriptor table 27-1 to 27-*k* is cleared to "0" (step 602).

Then, the value of the parameter i is incremented (step 604). If the value of the parameter i exceeds the number of descriptor tables k, control is returned to step 502. Otherwise, a check is made on the flag 273 of an entry RxTBL#i (RxHP) indicated by the pointer RxHP of the "i"th Rx descriptor table (step 608). If "0" is not indicated in the flag 273, it is judged that there is no entry containing valid data in the "i"th Rx descriptor table, and control is returned to step 604.

Figure 17:
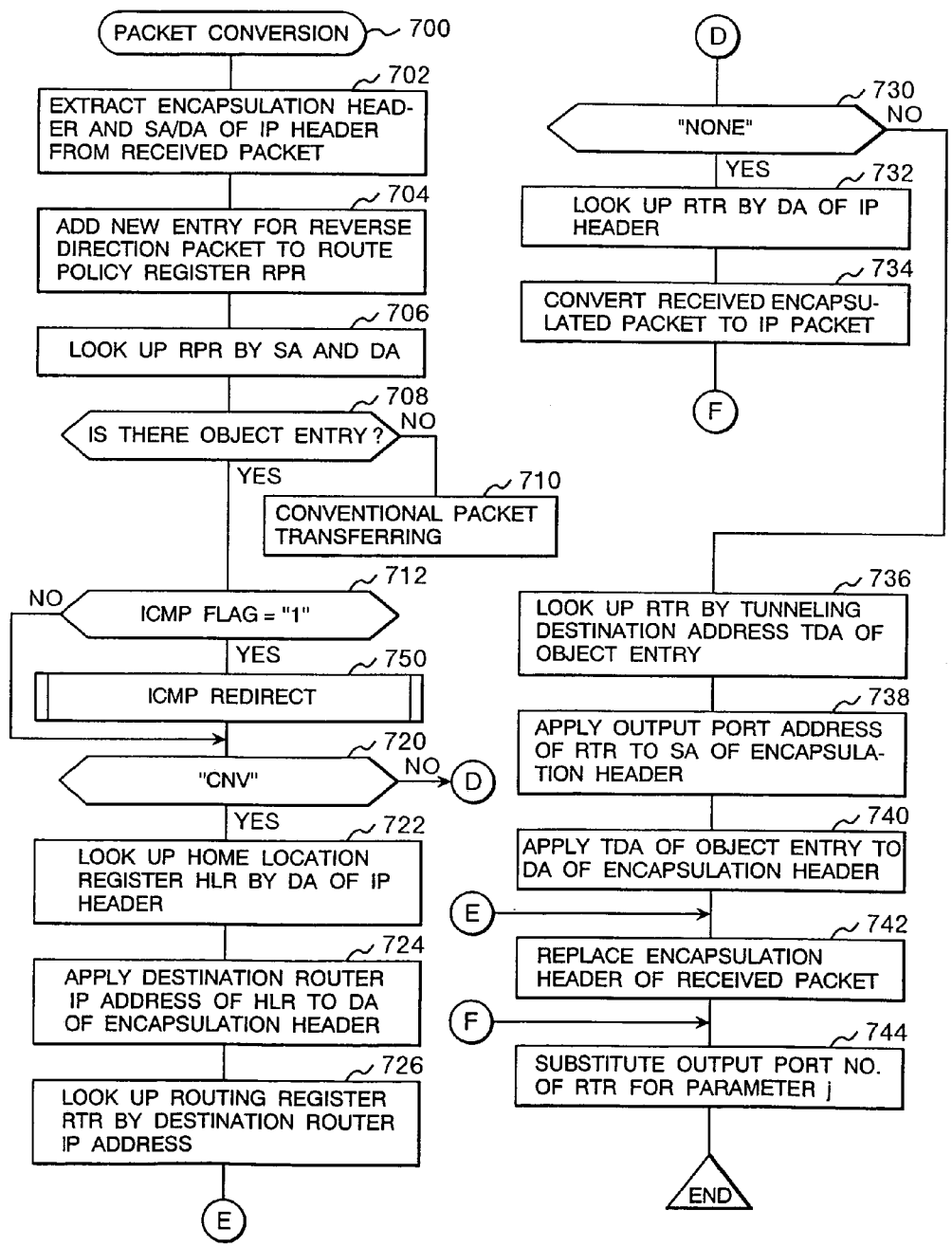
FIG. 17 is a detailed flowchart showing a conversion process 700 in the received packet transfer processing routine presented in FIG. 16.
Figure 19:
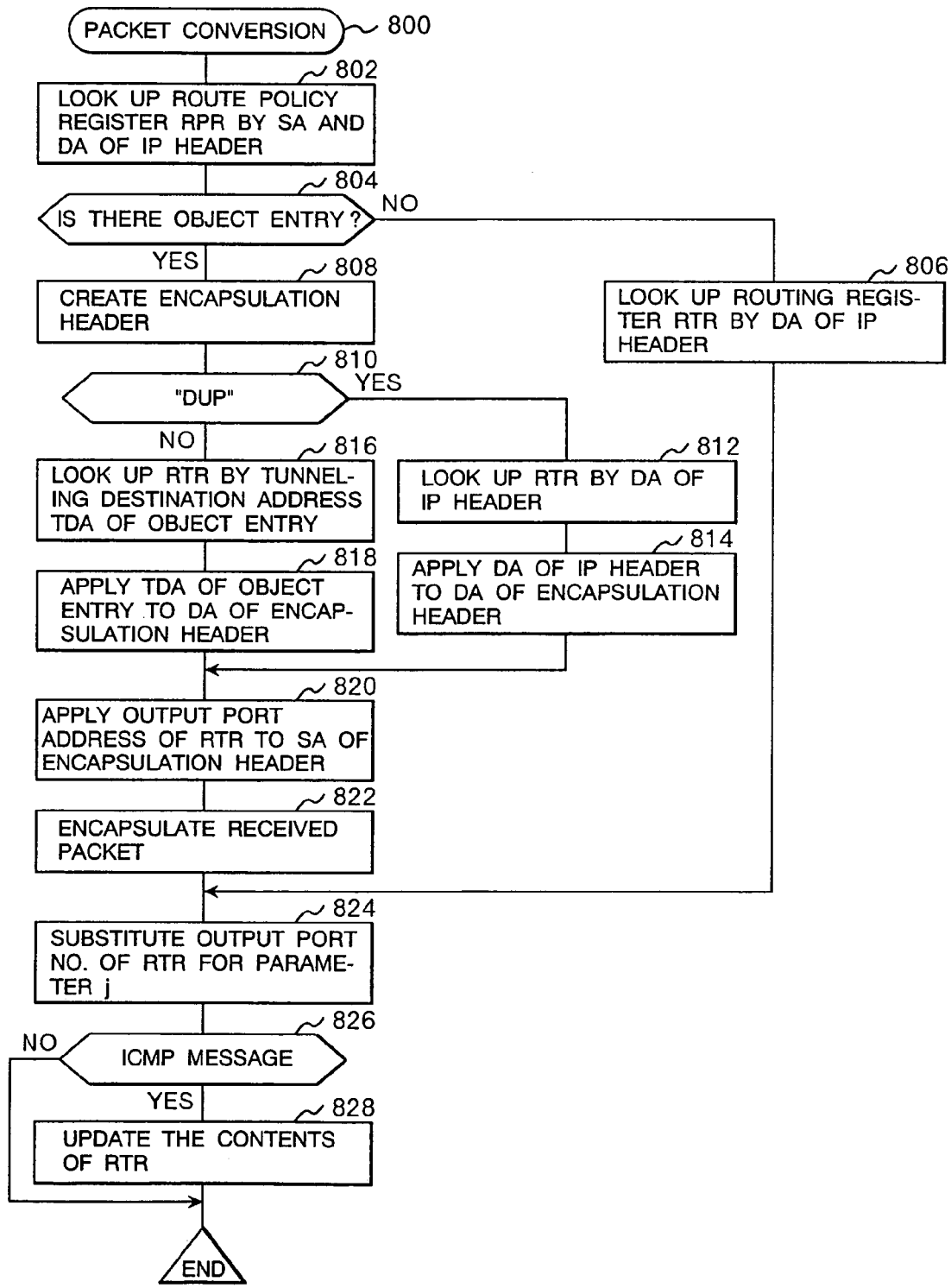
FIG. 19 is a detailed flowchart showing a conversion process 800 in the received packet transfer processing routine presented in FIG. 16.

If "0" is indicated in the flag 273, an address Ax registered in the field 271 of the entry RxTBL#i (RxHP) is read out and set as a read address RA. Then, a judgment is formed to check whether a received packet stored in the memory block BM (RA) indicated by the address RA in the buffer memory 22 is an encapsulated packet or not (step 612). If the received packet is encapsulated, a packet conversion processing routine 700 shown in FIG. 17 is carried out. If the received packet is an ordinary IP packet, a packet conversion processing routine 800 shown in FIG. 19 is carried out.

Through execution of the packet conversion processing routine 700 or 800, the received packet stored in the memory block BM (RA) of the buffer memory 22 is converted into an outgoing packet and an output port number "j" for the outgoing packet is identified. Therefore, after execution of the packet conversion processing routine 700 or 800, the address WA and a length of the outgoing packet are set in an entry TxTBL#j (TxTP) indicated by the pointer TxTP in the "j"th Tx descriptor table, the flag 238 is set to "1" (step 614), and a value of the pointer TxTP is incremented (step 616). Further, in the "i"th Rx descriptor table, the flag 273 of the entry RxTBL#i (RxHP) is set to "1" (step 618), and a value of the pointer RxHP is incremented (step 620). Then, control is returned to step 604.

As described by referring to FIG. 14, where a plurality of blocks are used for storing a received packet in the buffer memory 22, it is necessary for the packet transfer processing routine to successively transfer subsequent data blocks of the same packet to the TxTBL#j before changeover to the RxTBL. In this case, the first block of each received packed, which has been read out from address RA at step 610, has the header field containing information of a packet length. Therefore, it is preferable to provide the following arrangement: At a point of time when the first block is accessed, the number of subsequent blocks is calculated using the packet length and the block size MAX. Then, after execution of step 620, the number of subsequent blocks is checked. If the number of subsequent blocks is zero, control is returned to step 604. If the number of subsequent blocks is one or more, the next address RA is taken out from the RxTBL#i (RxHP). Then, after the number of subsequent blocks is decremented, control is returned to step 614.

Referring to FIG. 17, there is shown a detailed flowchart of the packet conversion processing routine 700 to be carried out if the received packet is an encapsulated packet.

In this routine, the encapsulation header of the received packet stored in the memory block BM (RA) of the buffer memory 22 is extracted and stored into a work area. In addition, the source IP address SA (e.g., address A) and the destination IP address DA (e.g., address B) contained in the header (IP header) specified in the data field 313 of the received packet are extracted (step 702).

Then, a route policy entry (e.g., entry 250-22 in FIG. 11, or entry 250-32 in FIG. 12) required for packet transfer in the reverse direction of the above IP packet (the direction from "B" to "A" in this example) is generated and added to the route policy register (RPR) 25 (step 704). Note that no new entry is added to the router policy register 25 if an entry having the same combination of SA and DA has already been registered in the route policy register 25. In an example where the entry 250P-32 for the "upward/downward same route" policy has already been registered in the route policy register 25-B in the destination router 1B, a new entry 250-32 for the "shortcut route" policy is not added thereto at step 704. If it is desired to change the "upward/downward same route" policy to the "shortcut route" policy for a particular existing entry, the particular existing entry may be removed or the contents thereof may be altered by an operator using the input/output device 29.

Then, according to the combination of SA and DA in the above IP header, the route policy register 25 is referred to look up an object entry corresponding thereto (step 706). If the object entry corresponding to the combination of SA and DA is not found in the route policy register 25, an ordinary packet transfer processing is carried out (step 710).

In the ordinary packet transfer processing (step 710), the received packet is transferred in a conventional method without applying any route policy of the present invention. That is to say, where the node apparatus is used as a home agent node, the home location register (HLR) 23 is referred to according to the destination IP address DA to obtain a router IP address. Then, the router IP address thus obtained is set as a destination address DA in the encapsulation header. According to the destination address DA in the encapsulation header, the routing register (RTR) 24 is referred to obtain an output port IP address. The output port IP address thus obtained is set as a source address SA in the encapsulation header. Then, a code number of the output port is set in parameter j, and this routine is terminated. Where the node apparatus is used as a router, it is judged that the received packet has been encapsulated by mistake. Then, the encapsulation header is removed, and the IP packet part is left in the memory block BM (RA) of the buffer memory 22. Thereafter, the packet conversion processing 800 is carried out.

Figure 18:
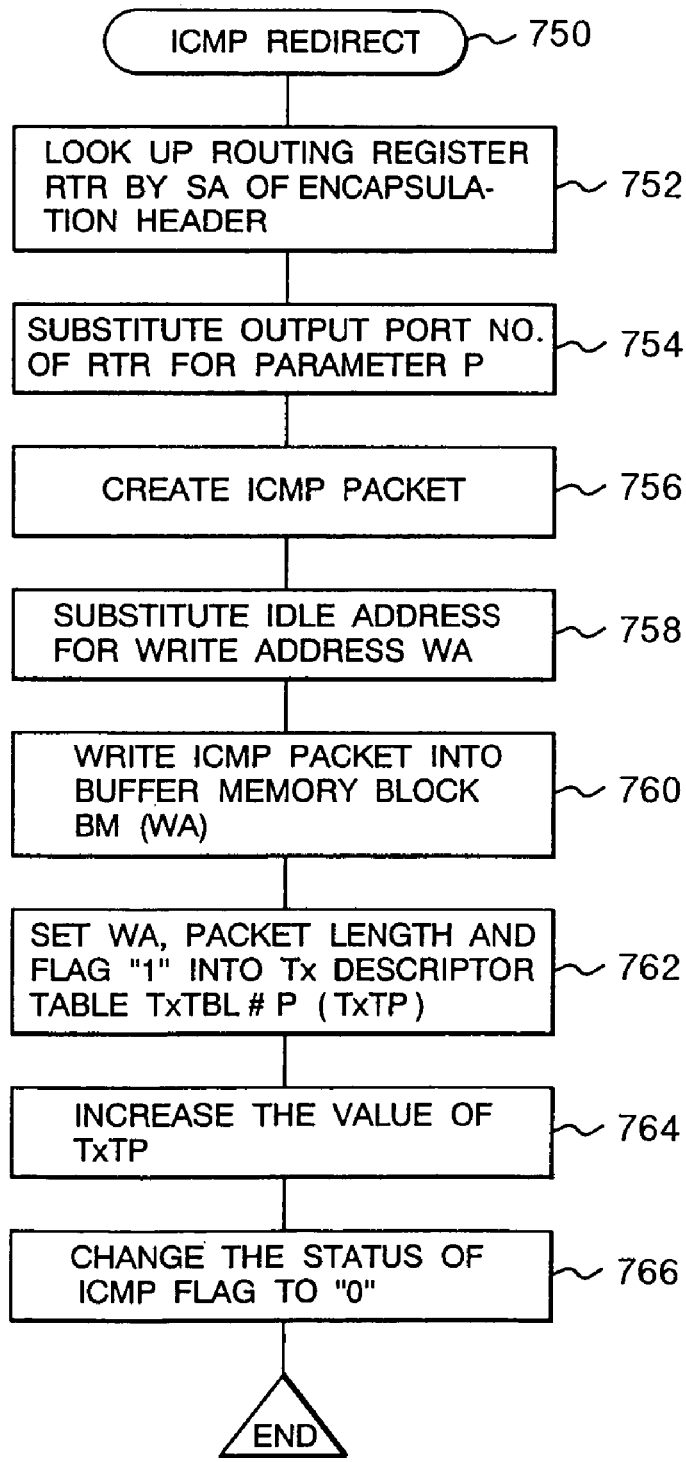
FIG. 18 is a detailed flowchart showing an ICMP redirect step 750 in the conversion process 700 presented in FIG. 17.

If the object entry is found in the route policy register 25 at step 708, the ICMP flag 255 of the object entry is checked (step 712). If "1" is indicated in the ICMP flag 255, an ICMP redirect routine 750 shown in FIG. 18 is carried out, and then the contents of the tunneling destination address (TDA) field 254 of the object entry are checked (step 720).

If "CNV" is indicated in the tunneling destination address (TDA) field 254, the home location register HLR 23 is referred to according to the IP header DA of the received packet (step 722). Then, the destination router IP address 232 in the home location register 23 is set as an destination address DA of the encapsulation header in the work area (step 724). As a source address SA of the encapsulation header in this case, the source address attached to the encapsulation header of the received packet is used intactly.

Thereafter, according to the destination address DA, the routing register 24 is referred to in order to look up an output port number 243 (step 726), the encapsulation header of the received packet stored in the buffer memory 22 is replaced with the contents of the work area (step 742), and the output port number 243 obtained by referring to the routing register 24 is set in parameter j (step 744). Then, this routine is terminated. Note that the above steps 722 to 726 are unique to the home agent node 2 and these steps are not carried out in the destination and origination routers 1A and 1B.

If "CNV" is not indicated in the tunneling destination address field (TDA) 254, it is checked whether "NONE" is indicated or not (step 730). If "NONE" is indicated in the tunneling destination address field 254, the routing register 24 is referred to according to the IP header DA (step 732). Then, the received packet stored in the memory block BM (RA) of the buffer memory 22 is converted into an IP packet having no encapsulation header (step 734). Then, control proceeds to step 744.

In the present preferred embodiment, in case of other than "CNV" and "NONE", the tunneling destination address field 254 indicates an actual IP address value. In the route policy register 25-A in FIG. 10, "DUP" is shown in the tunneling destination address field 254 of the entry 250-11. However, this entry 250-11 is handled by the packet conversion processing 800 when an IP packet is received, and the entry 250-11 is not related to the packet conversion processing 700 to be carried out when an encapsulated packet is received.

If an actual IP address value is indicated in the tunneling destination address field 254, the routing register 24 is referred to according to the actual address (step 736). An output port address specified in the routing register 24 is set as a source address SA of the encapsulation header stored in the work area (step 738), and the address value indicated in the tunneling destination address field 254 is set as a destination address DA of the encapsulation header (step 740). Then, control proceeds to step 742.

Referring to FIG. 18, there is shown a detailed flowchart of the ICMP redirect routine 750.

In this routine, the routing register (RTR) 24 is referred to according to the source address SA of the encapsulation header stored in the work area (step 752), and an output port number indicated in the routing register 24 is set in parameter p (step 754). Then, an IP packet of an ICMP redirect message is generated (step 756), an idle address taken out of the idle address queue 26 is set as a write address WA (step 758), and then the ICMP packet is written into the memory block BM (WA) of the buffer memory 22 specified by the write address WA (step 760). The ICMP redirect message indicates a request to the destination node for altering routing information of a packet having particular source and destination IP addresses.

Thereafter, the write address WA, length of the ICMP packet, and flag 1 are set in an entry area TxTBL#p (TxTP) indicated by the pointer TxTP in the "p"th Tx descriptor table (step 762). A value of the pointer TxTP is incremented (step 764), and the ICMP flag 255 of the object entry in the route policy register RTR 24 is reset to "0" (step 766). Then, this routine is terminated.

In execution of the packet conversion processing 700 mentioned above, the following operations are carried out as shown in FIGS. 3 to 6: conversion from the received encapsulated packet 320 into the outgoing encapsulated packet 330, conversion from the received encapsulated packet 330 into the outgoing IP packet 310, issuance of the ICMP redirect message 340, conversion from the received encapsulated packet 350 into the outgoing IP packet 310', and conversion from the received encapsulated packet 370 into the outgoing encapsulated packet 380.

Referring to FIG. 19, there is shown a detailed flowchart of the packet conversion processing routine 800 to be carried out if the received packet is an IP packet.

In this routine, the route policy register (RPR) 25 is referred to in order to look up an entry corresponding to the combination of the IP header SA and IP header of the received packet (step 802). If the object entry is not found in the route policy register 25 (step 804), the routing register (RTR) 24 is referred to according to the IP header DA (step 806), and an output port number indicated in the routing register 24 is set in parameter j (step 824). Further, it is checked whether or not the received packet is an ICMP redirect message addressed to the node itself (step 826). If the received packet is the ICMP redirect message addressed to the node itself, the route policy register 25 is updated (step 828), and then this routine is terminated.

For example, as shown in FIG. 4, when the origination router 1A receives the ICMP packet 340 from the destination router 1B, the origination router 1A adds a new entry 250P-11 to be carried out with precedence over the entry 250-11 in the route policy register 25-A.

If the object entry is found in the route policy register 25, an encapsulation header is generated in the work area (step 808). Then, it is checked whether or not "DUP" is indicated in the tunneling destination address (TDA) field 254 of the object entry (step 810). If "DUP" is indicated in the tunneling destination address field 254, the routing register (RTR) 24 is referred to according to the destination address DA of the IP header of the received packet (step 812). The destination address DA of the IP header is set as a destination address of the encapsulation header in the work area (step 814), and an output port address indicated in the routing register 24 is set as a source address of the encapsulation header (step 820). Then, after the contents of the memory block BM (RA) specified with the address RA in the buffer memory 22 are replaced with the received packet encapsulated by the encapsulation header (step 822), control proceeds to step 824.

If the tunneling destination address (TDA) field 254 of the object entry indicates other than "DUP", i.e., if an actual address value is indicated in the tunneling destination address field 254, the routing register (RTR) 24 is referred to according to the address indicated in the tunneling destination address field 254 (step 816). The address indicated in the tunneling destination address field 254 is set as a destination address of the encapsulation header (step 818), and then control proceeds to step 820.

In execution of the packet conversion processing 800 mentioned above, the following operations are carried out: conversion from the received IP packet 310 into the outgoing encapsulated packet 320 shown in FIG. 3, and conversion from the received IP packet 310' into the outgoing encapsulated packet 350 shown in FIG. 5. Further, if the entry 250P-32 for the "upward/downward same route" policy has been registered in the route policy register 25-B of the destination router 1B, it is allowed to carry out conversion from the received IP packet 360 into the outgoing encapsulated packet 370 shown in FIG. 6.

In the foregoing embodiments, under the initial condition, the origination router carries out tunneling communication to the destination home agent node for a packet received from the origination terminal, and the destination home agent node carries out tunneling communication to the destination router therefor. In a modified embodiment of the present invention, the following arrangement may be made: For a packet received from the origination terminal, the origination router carries out tunneling communication to the origination home agent node, the origination home agent node carries out tunneling communication to the destination home agent node, and then the destination home agent node transmits an ICMP redirect message to the origination router. Thereafter, the origination router carries out tunneling communication to the destination home agent node.

While the dedicated microcontroller and the DMA controller are equipped in the input interface 11A and the output interface 11B respectively in the embodiment shown in FIG. 1, there may also be provided such an arrangement that the microcontroller and the DMA controller are shared by the above two interfaces and that the packet reception processing 400 and the packet transmission processing 500 are conducted alternately for each packet by the controller.

While each entry in the route policy register 25 is used to define a header processing rule for a particular combination of source and destination IP addresses as shown in FIGS. 10 to 12, masked IP address information including a plurality of terminal addresses may be applied to at least one of the IP address fields 251 and 252 so as to define a header processing rule for communication between terminal groups by using one entry.

Further, in the foregoing embodiments, where the "shortcut route" policy is specified, the origination router 1A adds the entry 250P-11 to the route policy register upon receipt of the ICMP redirect message so that the added entry 250P-11 takes precedence over the original entry 250-11 as shown in FIG. 10. Thereafter, for a subsequent received packet addressed from the terminal 5A (source address "A") to the destination terminal 5B (destination address "B") the origination router 1A carries out tunneling communication to the destination router 1B. In this case, if the added entry 250P-11 is left indefinitely, all the packets transmitted from the terminal 5A in the next communication between the terminals 5A and 5B are transferred to the router 1B according to the added entry. At this point of time, if the destination terminal 5B moves to a location covered by another router, these packets do not reach the terminal 5B.

To circumvent the above problem, the original entry 250-11 is preferably stored in the router 1A when the entry 250P-11 is added. Further, it is preferable to delete the above entry 250P-11 by proper timing control for validating the original entry 250-11. Thus, for a packet addressed from the terminal 5A to the terminal 5B, the destination home agent node 2a is used again. Similarly, in the destination router 1B, it is also preferable to change the ICMP flag 255 of the entry 250-31 back to "1" by proper timing control. In a modified arrangement of the present invention, a program timer may be provided for each entry (250P-11, 250-31) to be altered in the route policy register 25, for example. In this modified arrangement, the program timer is reset each time the entry is referred to. On occurrence of a time-out due to no reference, it is checked whether the entry is an added entry or a flagged entry. Then, the entry is removed if it is an added entry, or the ICMP flag is set again if it is a flagged entry.

As set forth hereinabove, in the present invention, a route selection policy is specified according to a combination of source and destination addresses, thereby enabling packet communication while reducing the number of tunnels between an origination node and a destination node. This makes it possible to reduce a delay in packet transfer. Further, where the "shortcut route" polity is applied as a route selection policy, a load on a home agent node can be reduced advantageously in addition of reduction in transfer delay. Where the "upward/downward same route" policy is applied, usage-sensitive-rate charging in both the upward and downward directions can be made in the same home agent node, thereby offering an advantage of facilitating operations required for the charging.

Still further, as in the route policy register discussed in the foregoing preferred embodiments, the route selecting functions of the present invention for performing conversion from a received packet into an outgoing packet by referring to the entry table containing header processing rules can be applied universally to different kinds of node apparatuses including routers, brouters and home agent nodes.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A node apparatus comprising:
   a first memory including a plurality of entries each defining routing information corresponding to a packet destination address;
   a second memory including a plurality of entries each defining a header processing rule corresponding to each combination of a source address and a destination address of an IP packet; and
   a controller for converting a received packet into an encapsulated outgoing packet according to a header processing rule defined in said second memory and for delivering the outgoing packet to an output port according to routing information defined in said first memory, wherein each of said entries in said second memory includes flag information indicating whether or not a control packet should be sent to a node specified by a source address of a packet received in an encapsulated form, and wherein said control packet instructing said node apparatus to change a tunneling destination of an IP packet to be sent in an encapsulated form.

2. A node apparatus comprising:
a first memory including a plurality of entries each defining routing information corresponding to a packet destination address;
a second memory including a plurality of entries each defining a header processing rule corresponding to a combination of a source address and a destination address of an IP packet; and
a controller for converting a received packet into an encapsulated outgoing packet according to a header processing rule defined in said second memory and for delivering the outgoing packet to an output port according to routing information defined in said first memory,
wherein said controller adds an entry having a new combination of a source address and a destination address to said second memory when an encapsulated packet is received from another node apparatus.

3. A node apparatus comprising:
a plurality of interface devices each having an input port and an output port; and
a routing controller coupled with each of said interface devices;

wherein said routing controller comprises:
a buffer memory for storing packets received from each of said interface devices,
a first memory including a plurality of entries each defining routing information corresponding to a packet destination address,
a second memory including a plurality of entries each defining a header processing rule corresponding to a combination of a source address and destination address of an IP packet, and
a processor for converting a received packet stored in said buffer memory into an encapsulated outgoing packet according to a header processing rule defined in said second memory and for transferring the outputting packet to an interface device selected according to routing information defined in said first memory,
wherein each of said entries in said second memory defines a header processing rule corresponding to a combination of source and destination addresses contained in a header of an IP packet,
wherein each of said header processing rules indicates a source and destination address decision rule or an address value for tunneling communication, and
wherein said processor refers to said second memory according to source and destination addresses of a received IP packet read out from said buffer memory or obtained by decapsulating a packet which is received in an encapsulated form and stored in said buffer memory, and carries out conversion form said received packet into said outgoing packet.

* * * * *